US010330284B2

(12) United States Patent
Gordin et al.

(10) Patent No.: US 10,330,284 B2
(45) Date of Patent: Jun. 25, 2019

(54) APPARATUS, METHOD, AND SYSTEM FOR A MULTI-PART VISORING AND OPTIC SYSTEM FOR ENHANCED BEAM CONTROL

(71) Applicant: Musco Corporation, Oskaloosa, IA (US)

(72) Inventors: Myron Gordin, Oskaloosa, IA (US); Joel D. DeBoef, New Sharon, IA (US); Steven T. Heaton, Oskaloosa, IA (US); Chris P. Lickiss, Newton, IA (US); Luke C. McKee, Oskaloosa, IA (US)

(73) Assignee: Musco Corporation, Oskaloosa, IA (US)

( * ) Notice: Subject to any disclaimer, the term of this patent is extended or adjusted under 35 U.S.C. 154(b) by 0 days.

(21) Appl. No.: 15/644,100

(22) Filed: Jul. 7, 2017

(65) Prior Publication Data

US 2018/0010772 A1 Jan. 11, 2018

Related U.S. Application Data

(60) Provisional application No. 62/405,127, filed on Oct. 6, 2016, provisional application No. 62/359,931, filed (Continued)

(51) Int. Cl.
*B60Q 1/06* (2006.01)
*F21V 13/04* (2006.01)

(Continued)

(52) U.S. Cl.
CPC .............. *F21V 13/04* (2013.01); *F21V 5/007* (2013.01); *F21V 7/0066* (2013.01); *F21V 11/00* (2013.01);

(Continued)

(58) Field of Classification Search
CPC ...... F21V 5/007; F21V 7/0066; F21V 7/0083; F21V 11/00; F21V 11/02; F21V 11/04;

(Continued)

(56) References Cited

U.S. PATENT DOCUMENTS 8,717,552 B1 5/2014 Gordin et al.
8,770,796 B2 7/2014 Gordin et al.

(Continued)

FOREIGN PATENT DOCUMENTS

WO 2013173837 A1 11/2013
WO 2016185222 A1 11/2016

OTHER PUBLICATIONS

Musco Corporation, PCT/US2017/041139 filed Jul. 7, 2017, "Notification of Transmittal of the International Search Report and the Written Opinion of the International Searching Authority, or the Declaration", dated Oct. 17, 2017.

(Continued)

*Primary Examiner* — Jason M Han
(74) *Attorney, Agent, or Firm* — McKee, Voorhees & Sease, PLC

(57) ABSTRACT

Precision lighting design is a subcategory of lighting design which benefits from a concerted, synergistic effort to improve beam control; sports lighting is one such example. Beam control is improved when all light directing and redirecting devices are considered together, and insomuch that adverse lighting effects are best avoided when considering how all the lighting fixtures in an array interact with one another. To that end, envisioned is a multi-part visoring (i.e., light redirecting) and optic (i.e., light directing) system designed with consideration towards how a fixture lives in a mounted space—how its photometric and physical presence affects other fixtures in or proximate said space—while demonstrating improved beam control over that which is available to general purpose (e.g., indoor residential) lighting.

16 Claims, 39 Drawing Sheets

Figure 1A:
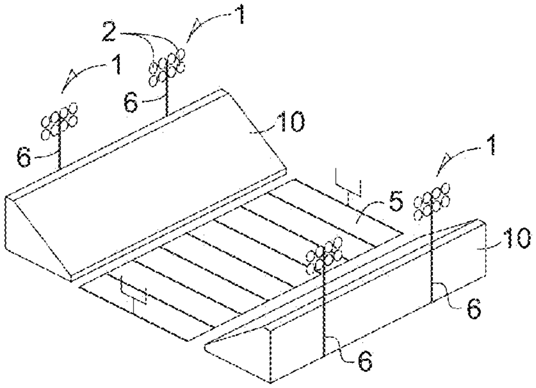

Related U.S. Application Data on Jul. 8, 2016, provisional application No. 62/359,747, filed on Jul. 8, 2016.

(51) Int. Cl.

| | |
|---|---|
| ***F21V 5/00*** | (2018.01) |
| ***F21V 7/00*** | (2006.01) |
| ***F21V 14/04*** | (2006.01) |
| ***F21V 21/30*** | (2006.01) |
| ***F21V 11/00*** | (2015.01) |
| ***F21V 17/02*** | (2006.01) |
| *F21Y 105/16* | (2016.01) |
| *F21Y 115/10* | (2016.01) |
| *F21W 131/105* | (2006.01) |
| *F21W 131/407* | (2006.01) |

(52) U.S. Cl.

CPC .............. *F21V 14/04* (2013.01); *F21V 17/02* (2013.01); *F21V 21/30* (2013.01); *F21W 2131/105* (2013.01); *F21W 2131/407* (2013.01); *F21Y 2105/16* (2016.08); *F21Y 2115/10* (2016.08)

(58) Field of Classification Search

CPC .......... F21V 13/02; F21V 13/04; F21V 14/04; F21V 17/02; F21V 21/14; F21V 21/26; F21V 21/28; F21V 21/29; F21V 21/30; F21Y 2115/10

USPC ....................... 362/217.01–217.17, 218–225, 362/249.02–249.04, 311.02, 319–325, 362/341–354, 368–372, 418–432, 800

See application file for complete search history.

(56) References Cited

U.S. PATENT DOCUMENTS

| | | | |
|---|---|---|---|
| 8,820,963 | B2 | 9/2014 | Olsen et al. |
| 8,866,406 | B2 | 10/2014 | Gordin et al. |
| 8,905,608 | B2 | 12/2014 | Gunther |
| 9,581,303 | B2 | 2/2017 | Gordin et al. |
| 2006/0139659 | A1 | 6/2006 | Steinberg |
| 2006/0198145 | A1 | 9/2006 | Gordin |
| 2006/0250804 | A1 | 11/2006 | Ginsburg |
| 2012/0068615 | A1 | 3/2012 | Duong et al. |
| 2012/0217897 | A1 | 8/2012 | Gordin et al. |
| 2013/0250556 | A1 | 9/2013 | Gordin et al. |
| 2014/0056019 | A1 | 2/2014 | Gunther |
| 2016/0265740 | A1 | 9/2016 | Booij et al. |

OTHER PUBLICATIONS

DeBoef, Joel D. et al, "Apparatus, Method, and System for Increasing LED Count While Maintaining Beam Control in Large Area LED Lighting Fixtures", U.S. Appl. No. 62/359,747, filed Jul. 8, 2016, 21 pages.

DeBoef, Joel D., "Apparatus and Method for a Multi-Part Visoring System Having Fixed and Pivotable Portions", U.S. Appl. No. 62/359,931, filed Jul. 8, 2016, 18 pages.

Gordin, Myron et al., "Ribbing on External Visor Systems to Reduce Glare at Common Veiwing Angles", U.S. Appl. No. 62/405,127, filed Oct. 6, 2016, 18 pages.

Gordin, et al., patent application entitled, "Apparatus, Method, and System for Increasing Efficiency in Wide Area LED Luminaires" U.S. Appl. No. 14/630,298, filed Feb. 24, 2015.

Section View

APPARATUS, METHOD, AND SYSTEM FOR A MULTI-PART VISORING AND OPTIC SYSTEM FOR ENHANCED BEAM CONTROL

CROSS-REFERENCE TO RELATED APPLICATIONS

This application claims priority under 35 U.S.C. § 119 to provisional U.S. Application Ser. No. 62/359,747, filed Jul. 8, 2016, provisional U.S. Application Ser. No. 62/359,931, filed Jul. 8, 2016, and provisional U.S. Application Ser. No. 62/405,127, filed Oct. 6, 2016, all of which are hereby incorporated by reference in their entirety.

I. TECHNICAL FIELD OF THE INVENTION

The present invention generally relates to improving control of the composite beam issued forth from an elevated and/or aimed lighting fixture containing a plurality of light sources. More specifically, the present invention relates to avoiding undesirable lighting effects in said lighting fixture while still providing desired beam cutoff—perceivable center beam shift—through improved beam control.

II. BACKGROUND OF THE INVENTION

Generally speaking, lighting is designed to adequately light a target area from some distance. However, there are some lighting applications which particularly focus on precise definitions of "adequately" and light target areas which are complex (e.g., in shape, in spatial orientation) from long distances (vertical and/or horizontal). These more precise lighting applications sports lighting applications being an example are in a separate class of lighting design, and one which benefits from improved beam control.

Focusing on such precise lighting applications, there are a number of issues in the art. For example, if the target is complex because of sheer size, then regardless of complexities due to shape or dimension (e.g., if uplight is needed) a primary concern is making a luminaire (also referred to as a lighting fixture) as luminously dense as possible—packing light sources as tightly as possible, using materials with the fewest inefficiencies or losses, tailoring operating conditions, etc.—so to ensure a maximum output and, therefore, minimize the number of needed fixtures. Of course, a luminously dense lighting fixture is not in and of itself entirely adequate for such lighting applications; a large quantity of light is not a benefit if it is not controlled in a precise manner. As such, another primary concern is how to use a number of light directing (e.g., lenses) and light redirecting (e.g., reflectors) devices so to ensure that said large quantity of light is shaped and directed in a preferred manner—for example, shaped so not to spill past a field of play while aimed so to be overlapped with other quantities of light so to build up a composite beam of desired intensity. Of course, this also introduces concerns. The composite beam from that luminously dense lighting fixture can only be shaped, directed, cut off, and otherwise controlled to a certain point using conventional wisdom and devices before the center beam starts to perceivably shift; the center beam typically being the point of maximum candela, but also often the photometric center of the composite beam. To be clear—any situation with an external visor will cause some minor shifting of the center beam projected from the emitting face of a lighting fixture including said visor; this is simply the nature of light redirection. This is the primary reason why center beam shift is discussed herein in the context of perceivable shift—which can be thought of thusly. A beam pattern has a defined shape and distribution. The maximum candela is a point somewhere in the defined shape, distribution tapering off therefrom. Shifting of the maximum candela from point A in the shape to point B in the shape is relatively unimportant as long as the distribution and shape are preserved. When maximum candela (or photometric center) is shifted so much (e.g., due to excessive pivoting of a visor) that shape and/or distribution is perceivably impacted, issues arise; in this sense, such shifting of the center beam is a bellwether for poor lighting design. Perceivable shifting of the center beam is a large concern in precision lighting design because, as is well known in the art, computer programs have long been used to optimize virtual lighting designs which form the blueprint for actual lighting systems, and often rely on the center beam as the aiming point for the virtual lighting fixtures which are placed and optimized. If the virtual center beam and the actual center beam do not match up when the actual product is installed and aimed, then beam patterns will not overlap as intended (resulting in, e.g., dark spots) and distribution will be off (resulting in, e.g., violation of lighting uniformity requirements in the specification); and generally speaking, beam control will not be maintained. These are but a few known concerns relating to beam control in the art of precision lighting design.

Currently a piecemeal approach is often taken to provide some degree of beam control in precision lighting design: higher efficacy light sources might be paired with a relatively inefficient luminaire housing, a visor might be added after the fact due to perceived glare but doing so results in a decrease in overall light levels, so then the light sources might be driven harder to compensate thereby reducing what was previously a high efficacy, and the compensation cycle continues. Each lighting fixture is typically designed in isolation with little to no attention paid to how that lighting fixture will "live" on a mount on a pole—how it will interact with other lighting fixtures on a common crossarm or other structure when trying to blend or overlap the composite beam output with that of other lighting fixtures. What is needed is a more synergistic approach to beam control which takes into account all of the aforementioned concerns.

Thus, there is room for improvement in the art.

III. SUMMARY OF THE INVENTION

Applications in the area of precision lighting design—such as sports lighting—benefit from a concerted, synergistic effort insomuch that beam control is improved when all light directing and redirecting devices are considered together, and insomuch that adverse lighting effects are best avoided when considering how all the lighting fixtures in an array interact with one another.

It is therefore a principle object, feature, advantage, or aspect of the present invention to improve over the state of the art and/or address problems, issues, or deficiencies in the art.

To that end, envisioned are apparatus, methods, and systems for a multi-part visoring (i.e., light redirecting) and optic (i.e., light directing) system designed with consideration towards how a fixture lives in a mounted space—how its photometric and physical presence affects other fixtures in or proximate said space—while demonstrating improved beam control over that which is available to general purpose (e.g., indoor residential) lighting.

Further objects, features, advantages, or aspects of the present invention may include one or more of the following:

a. increased luminous density by improved optic design;
b. maximized useful light (i.e., directed, redirected, or otherwise controlled so to place light in a desired location) by improved visor design;
c. minimized undesirable lighting effects (e.g., beam shift, shadowing, center beam shift, etc.) through a combination of said improved optic and visor design; and
d. minimized onsite and/or offsite glare through a combination of said improved optic and visor design so to effectuate improved beam control.

These and other objects, features, advantages, or aspects of the present invention will become more apparent with reference to the accompanying specification and claims.

IV. BRIEF DESCRIPTION OF THE DRAWINGS

From time-to-time in this description reference will be taken to the drawings which are identified by figure number and are summarized below.

Figure 1C:
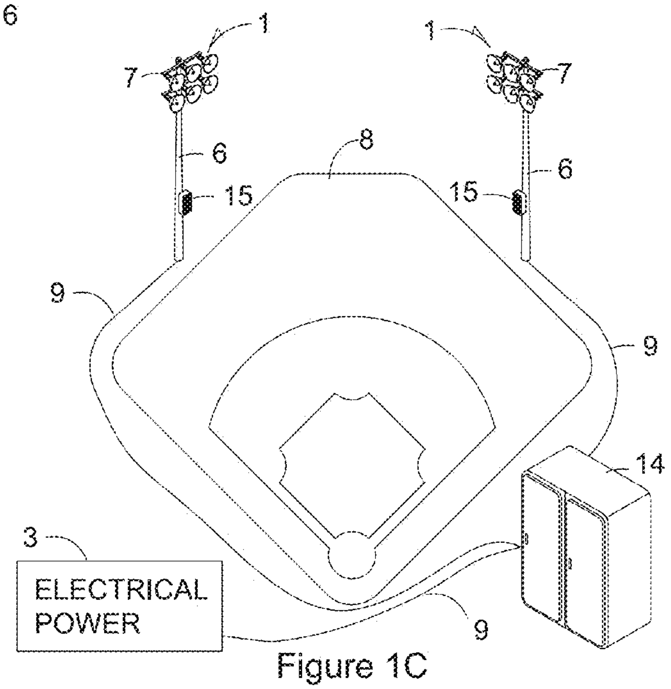
Figure 1B:
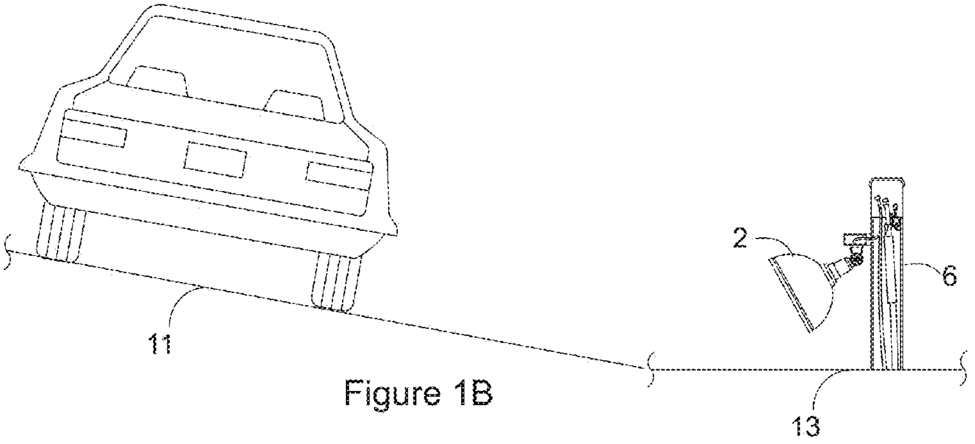
Figure 1B PRIOR ART
Figure 1D:
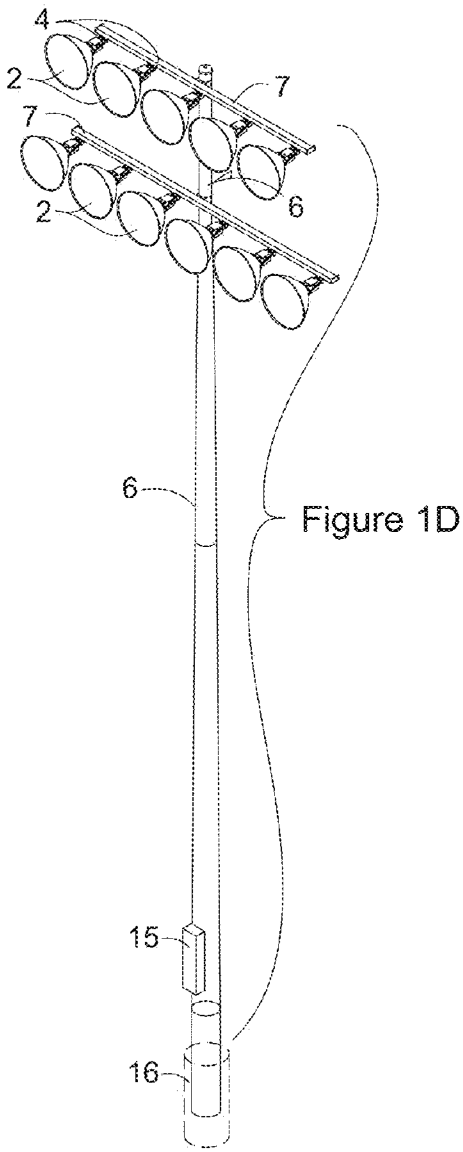
Figure 1E:
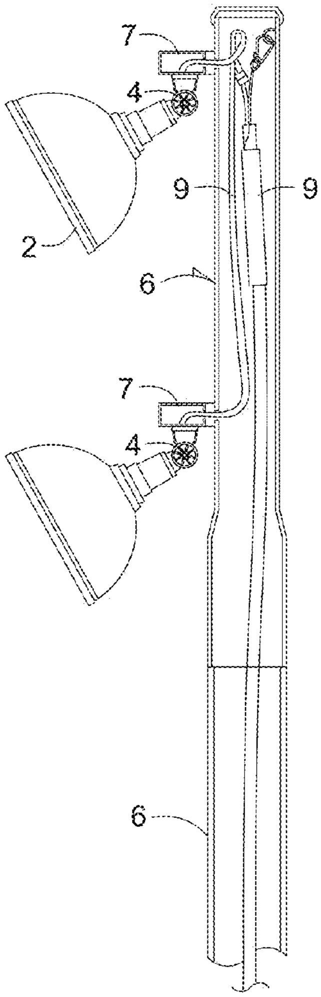
Figure 1F:
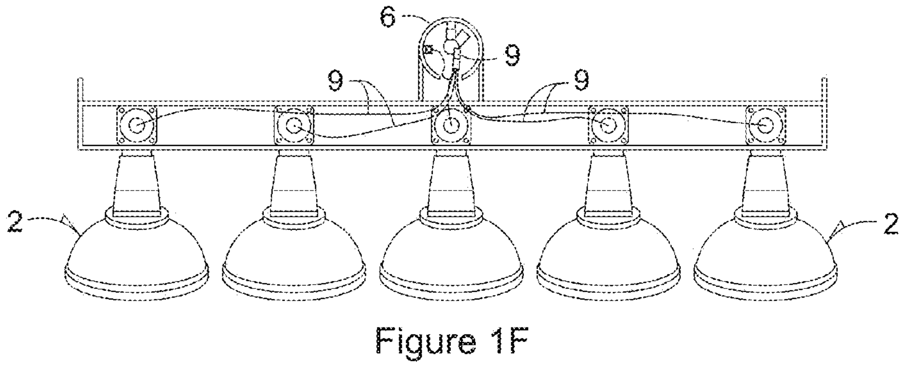
Figure 1F PRIOR ART

FIGS. 1A-F illustrate various views of lighting applications which require precise lighting design; note that for brevity, none of the figures illustrate complete lighting systems. FIG. 1A illustrates a football stadium with some associated lighting fixtures; FIG. 1B illustrates a portion of a race track with one associated lighting fixture; FIG. 1C illustrates a baseball field with some associated lighting fixtures; FIG. 1D illustrates an array of lighting fixtures on a pole which might be used in the lighting of FIGS. 1A and C; FIG. 1E illustrates an enlarged, partial side view of the array of lighting fixtures of FIG. 1D with a portion of the pole and crossarm removed to reveal inner wiring (hatching omitted for clarity); and FIG. 1F illustrates an enlarged top view of the array of lighting fixtures of FIG. 1D with a portion of the pole and crossarm removed to reveal inner wiring (hatching omitted for clarity).

Figure 2A:
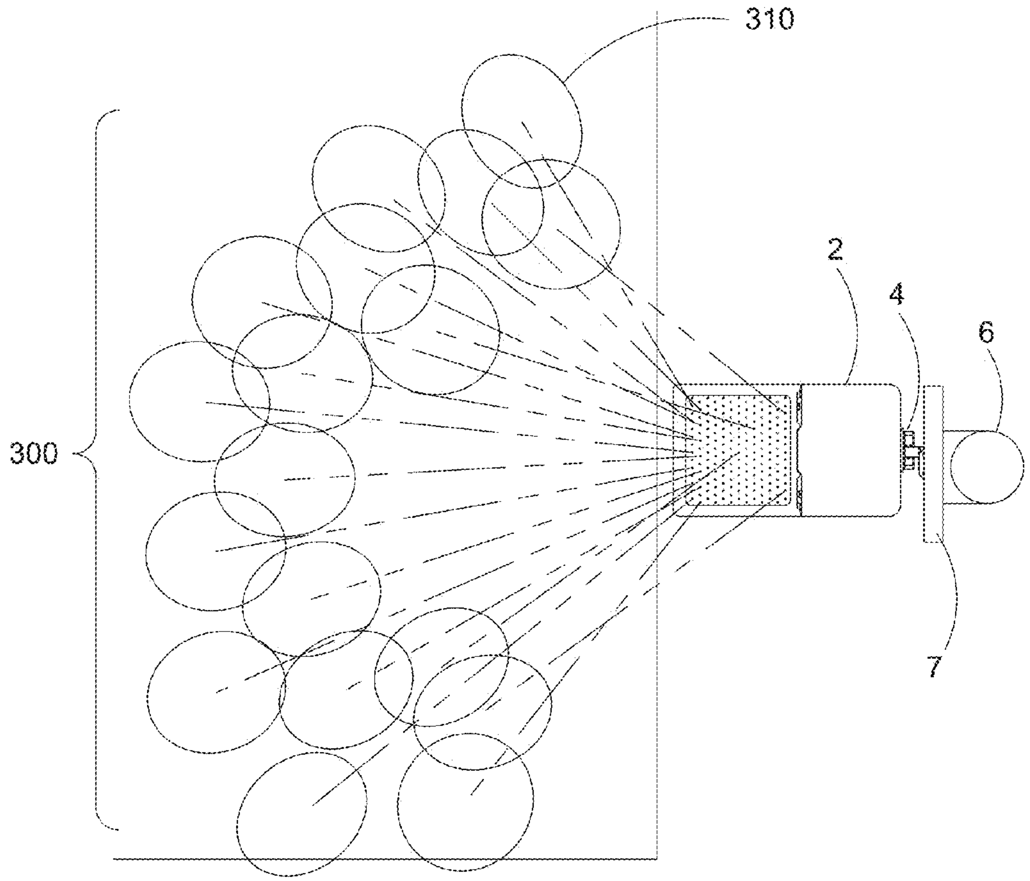
Figure 2A PRIOR ART
Figure 2B:
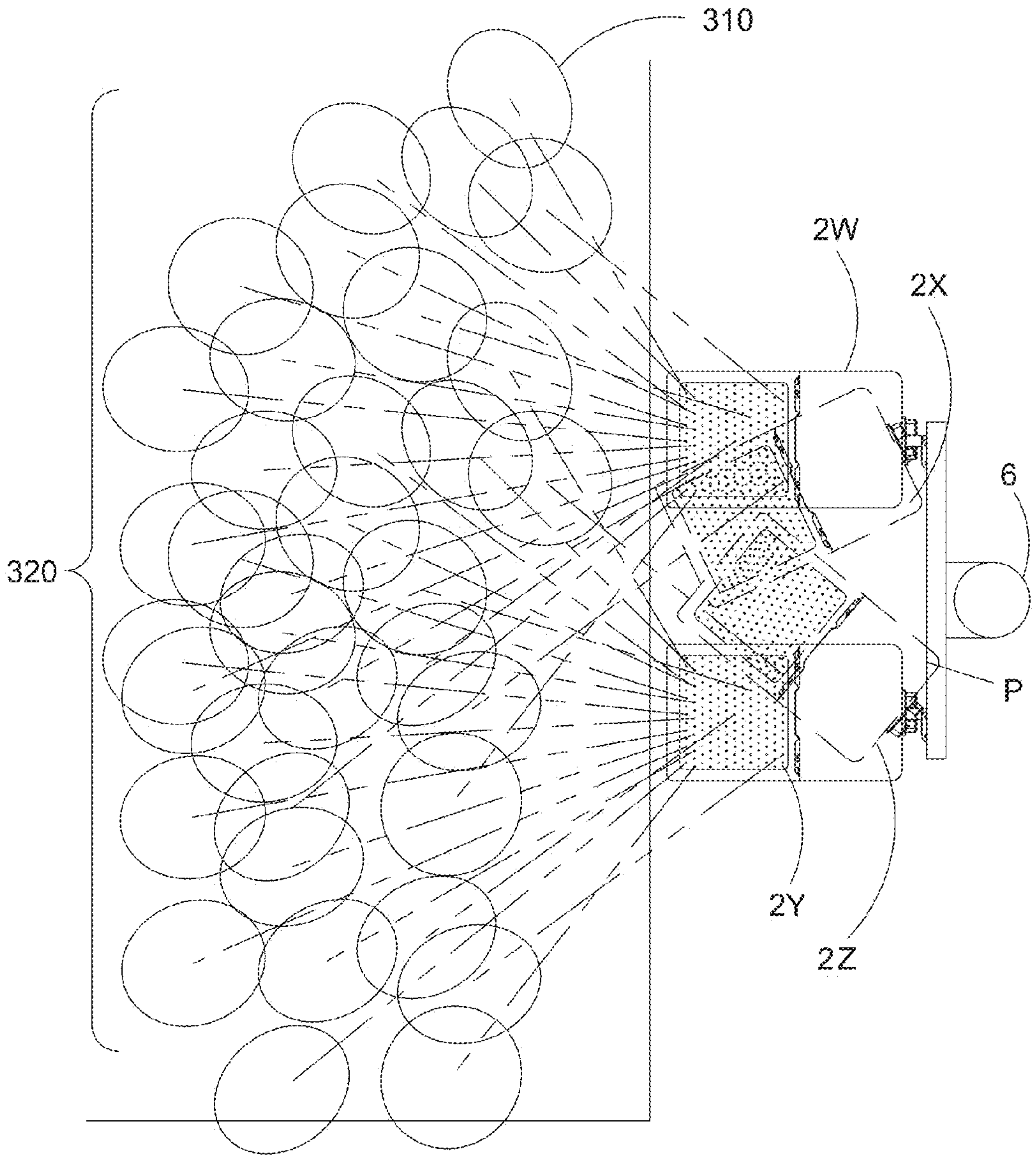
Figure 2B PRIOR ART
Figure 2C:
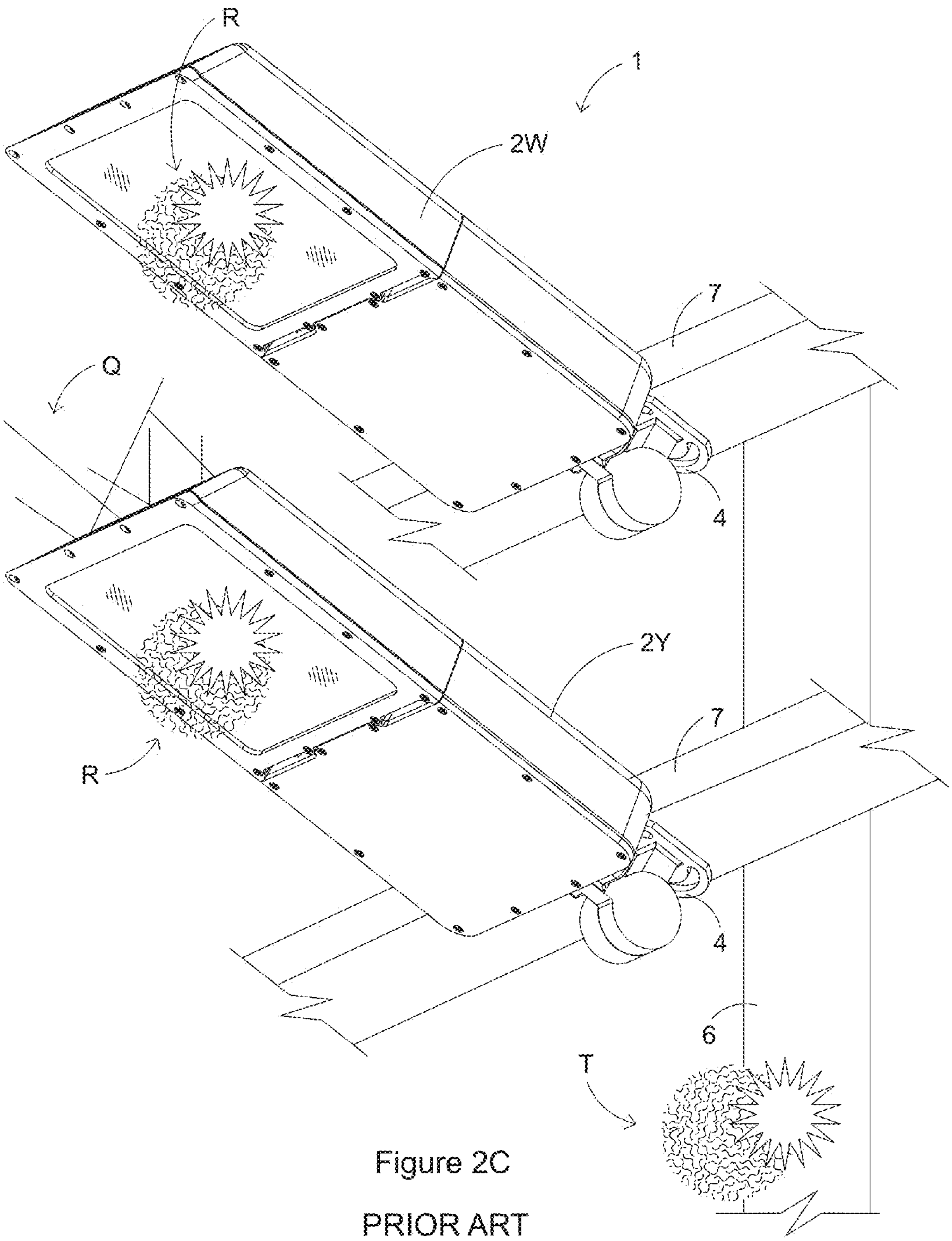
Figure 2C PRIOR ART

FIGS. 2A-C illustrate various views of prior art LED lighting fixtures mounted to a pole. FIG. 2A illustrates a single LED lighting fixture and diagrammatic depiction of a composite beam formed from individual beam patterns; FIG. 2B illustrates two LED lighting fixtures and diagrammatic depiction of a composite beam formed from individual beam patterns, as well as physical and photometric interference; and FIG. 2C illustrates two LED lighting fixtures and diagrammatic depiction of a composite beam formed from individual beam patterns, as well as physical and photometric interference, and further including diagrammatic depiction of at least some forms of undesirable lighting effects.

Figures 3A, 3B:
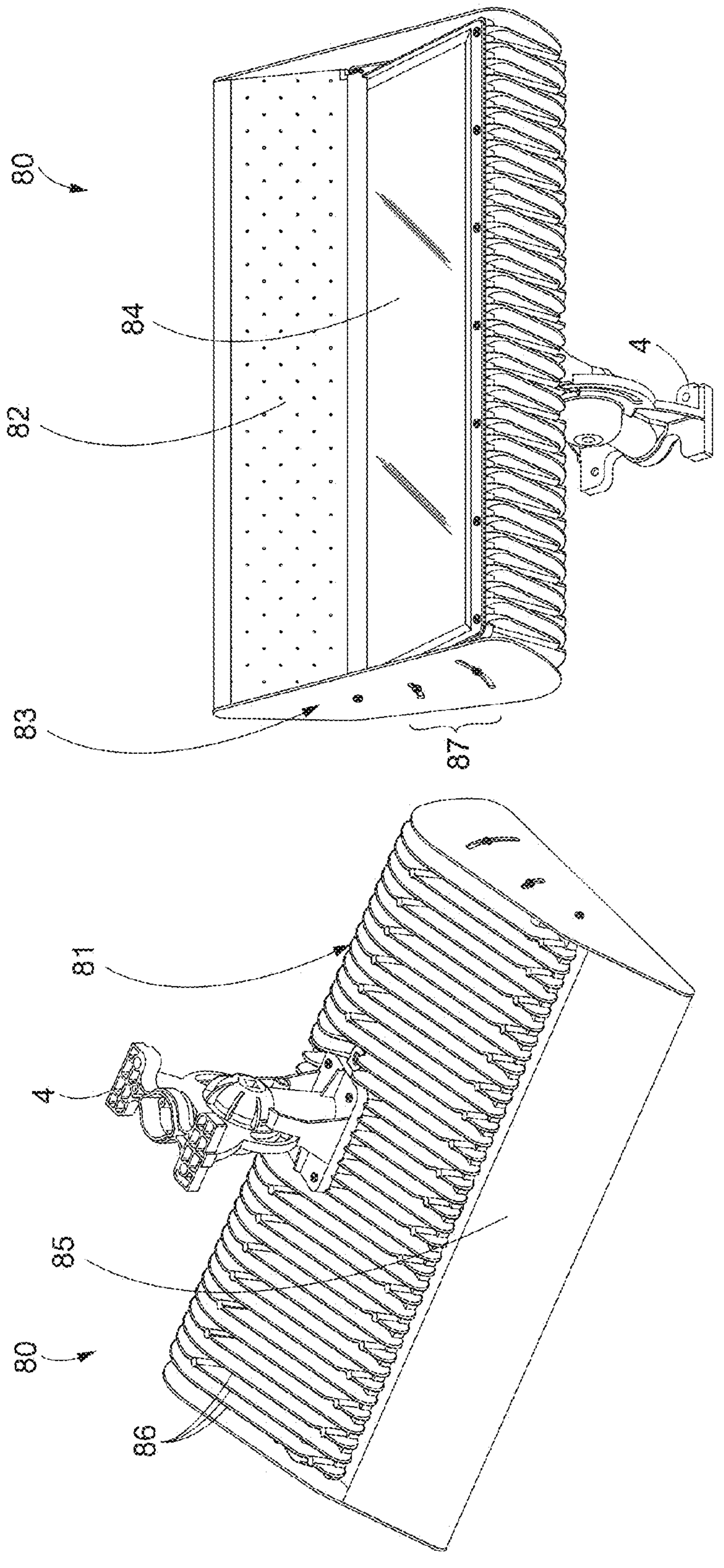
Figure 3A PRIOR ART

FIGS. 3A and B illustrate perspective views of a state-of-the-art precision lighting design LED luminaire which might be used in the lighting applications of FIGS. 1A-F to provide some degree of beam control.

Figure 4A:
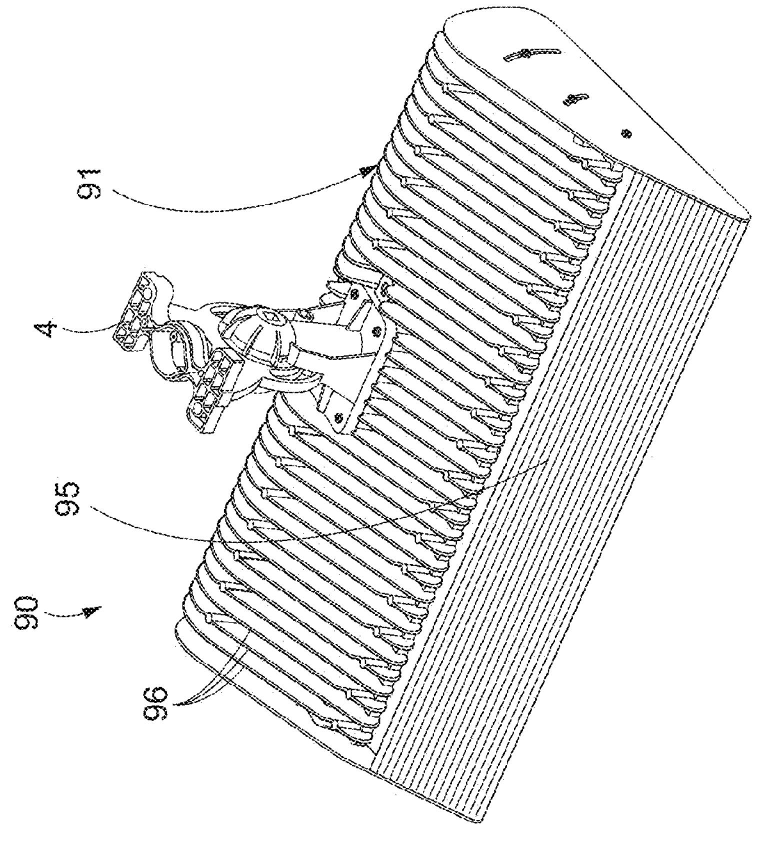
Figure 4B:
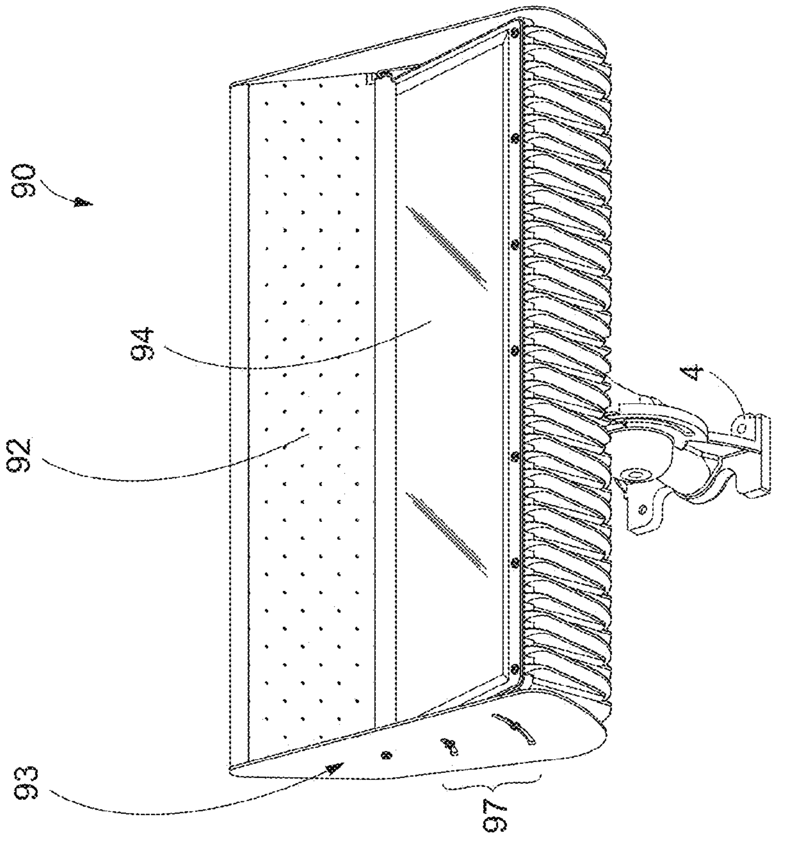
Figure 5A:
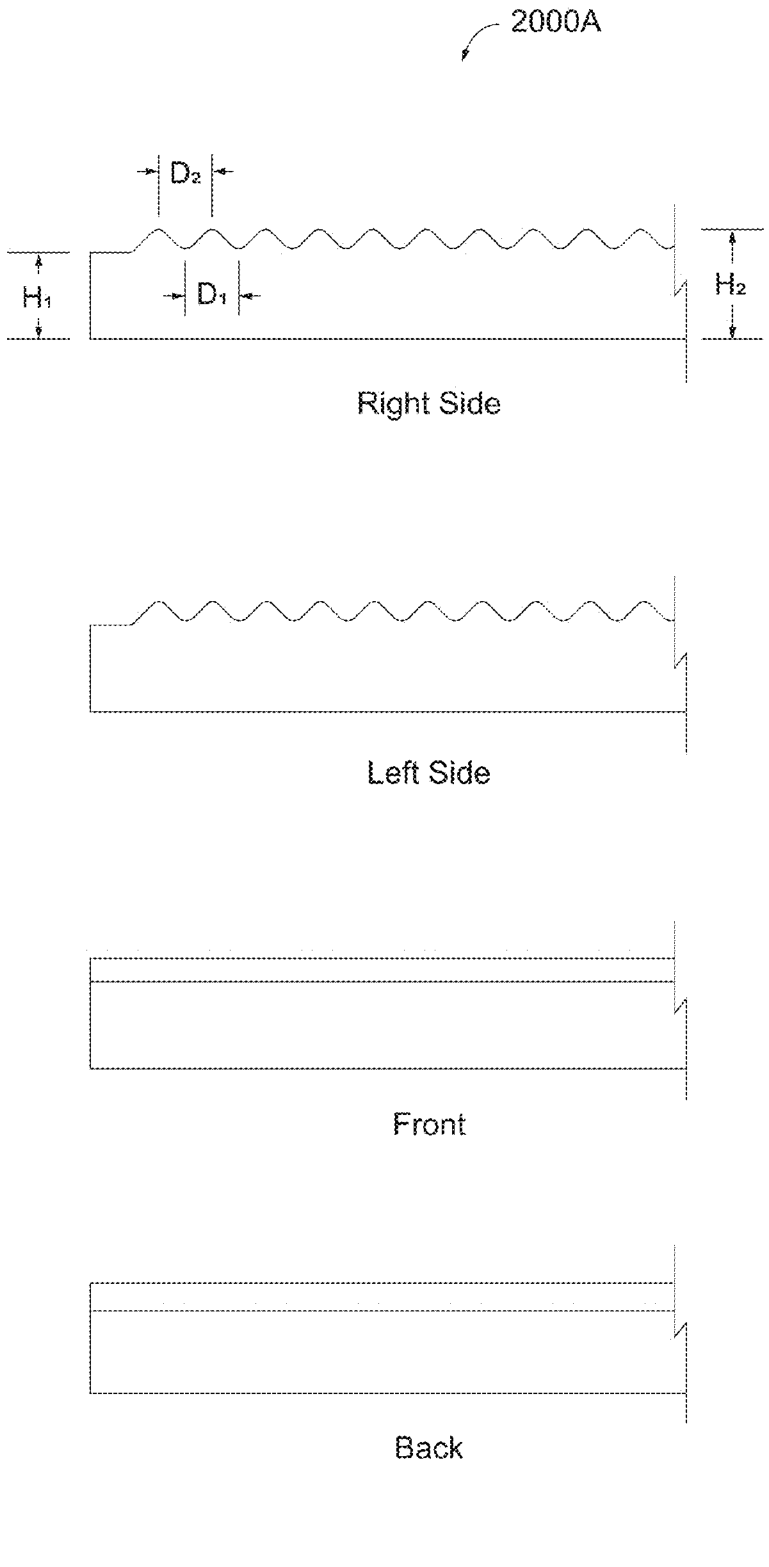
Figure 5B:
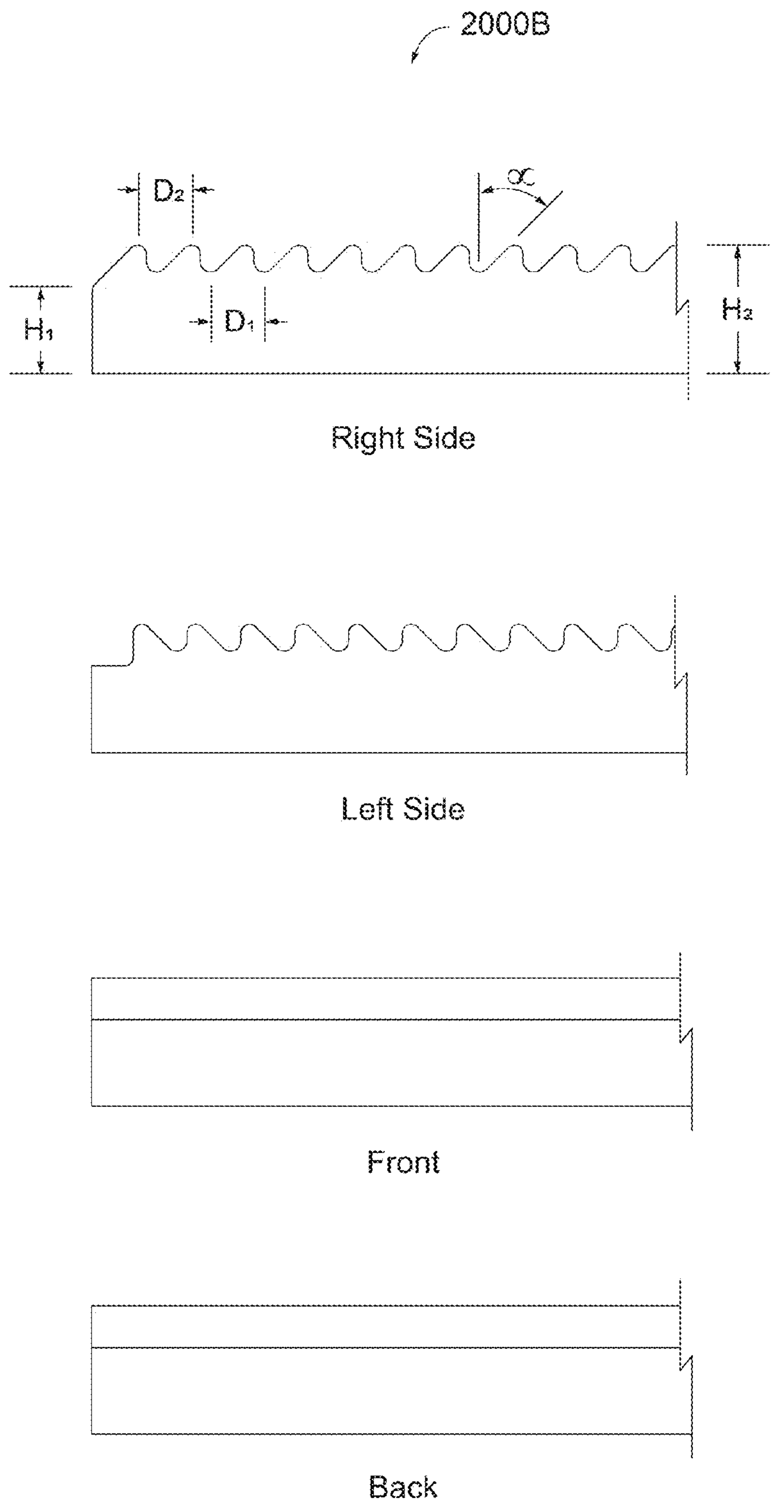
Figure 5C:
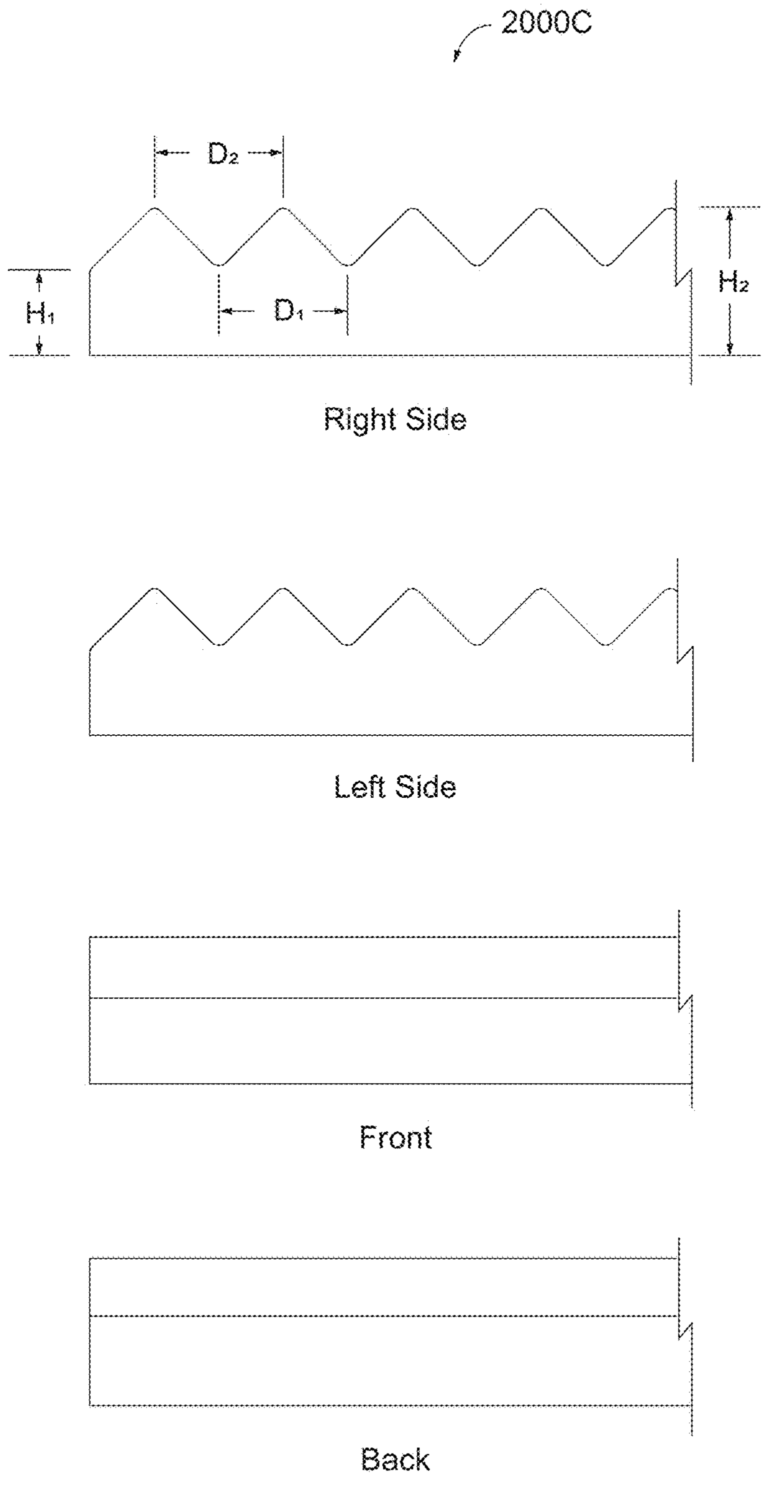
Figure 5D:
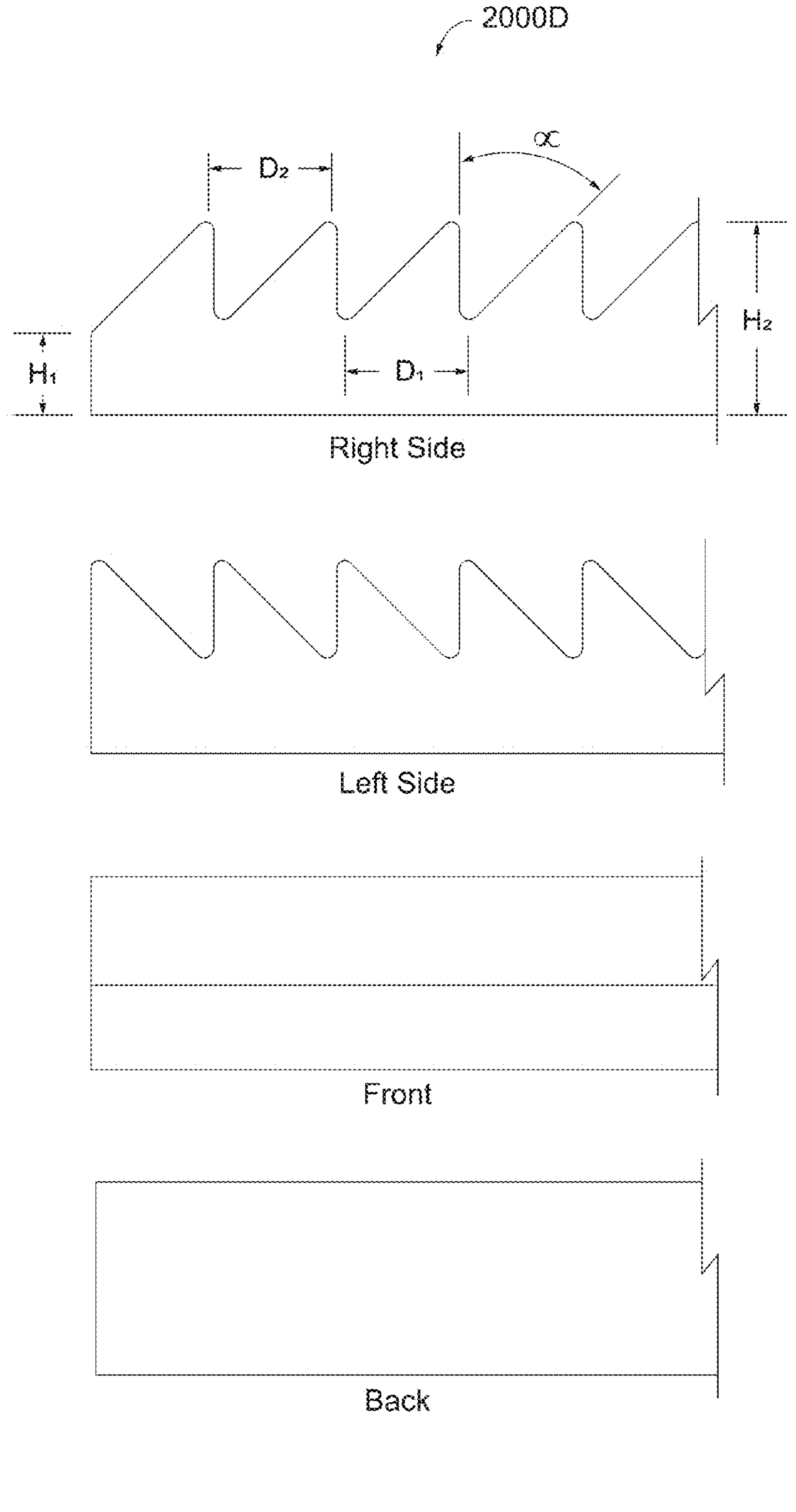
Figure 5E:
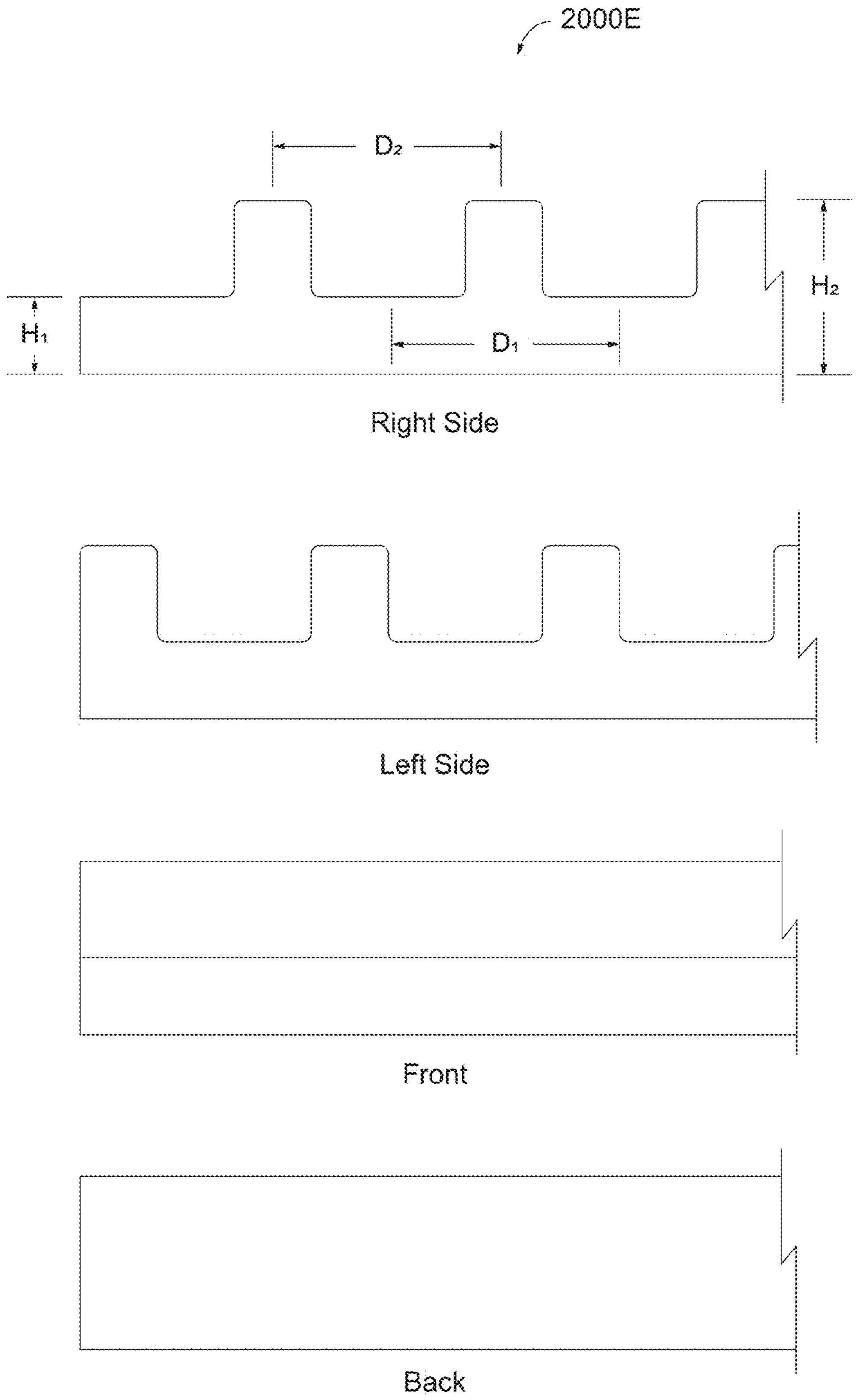

FIGS. 4A and B illustrate the LED luminaire of FIGS. 3A and B as modified according to at least some aspects of the present invention; here including a ribbed external visor.

FIGS. 5A-E illustrate various views of various designs of ribbing for the external visor of FIGS. 4A and B; note that in each ribbing design the end nearest H1 correlates to the distal tip of the external visor, whereas the end nearest H2 correlates to the proximate end of the external visor (i.e., end closest to the light sources).

Figure 6:
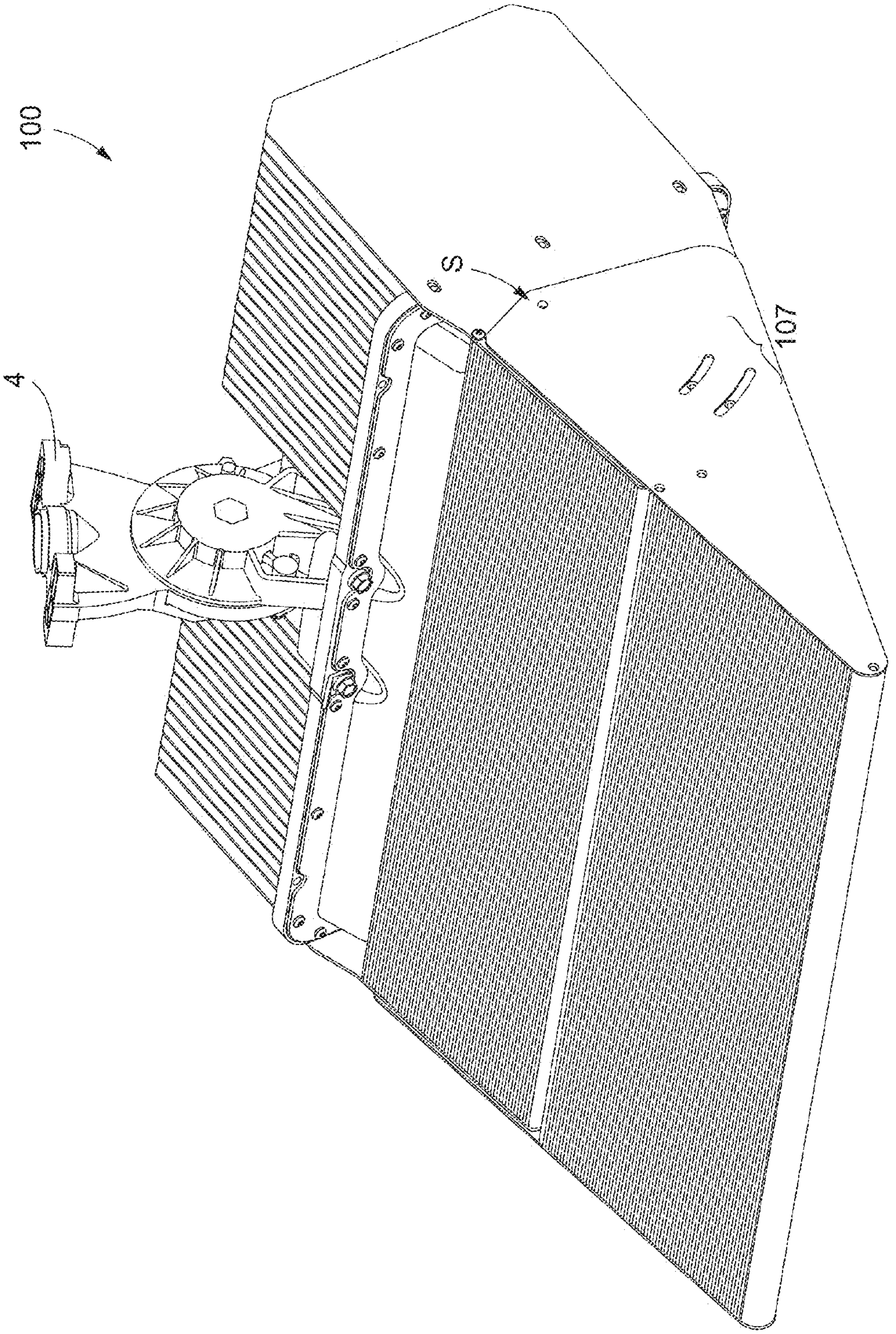
Figure 7:
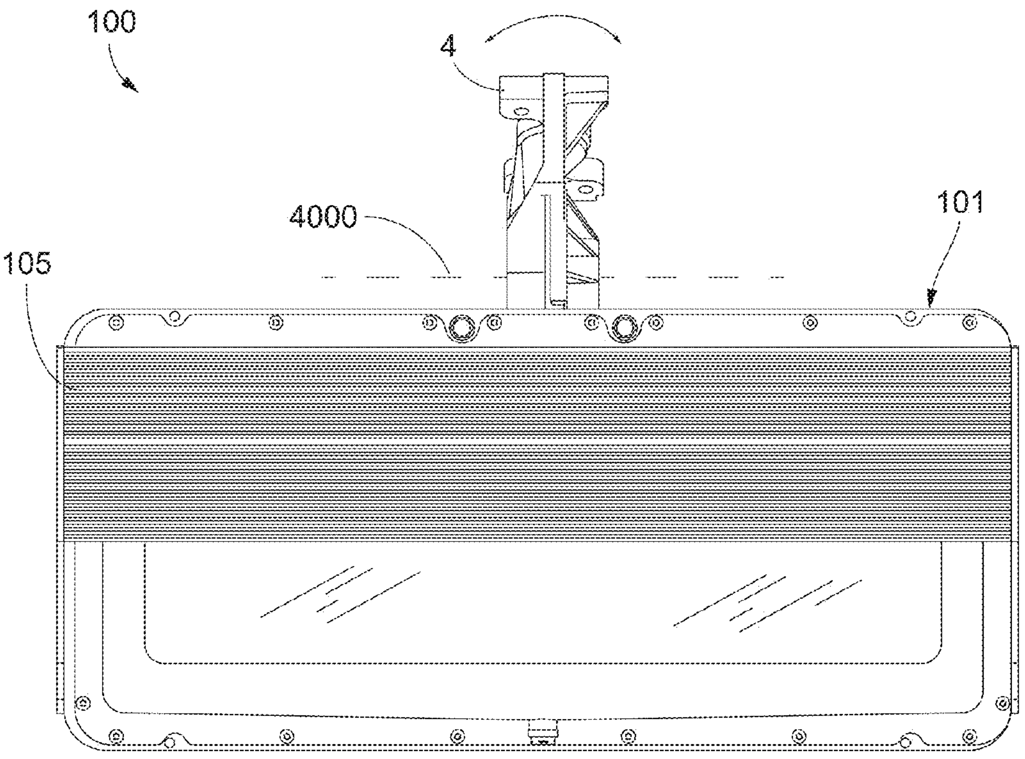
Figure 8:
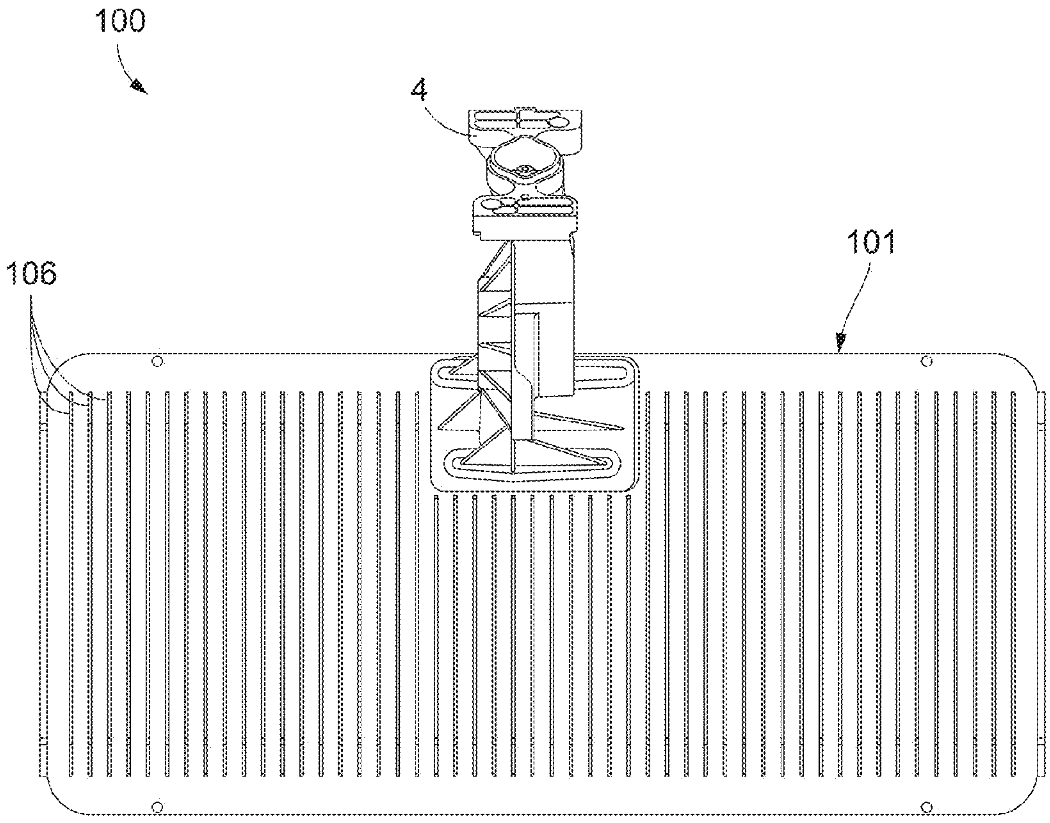
Figure 9:
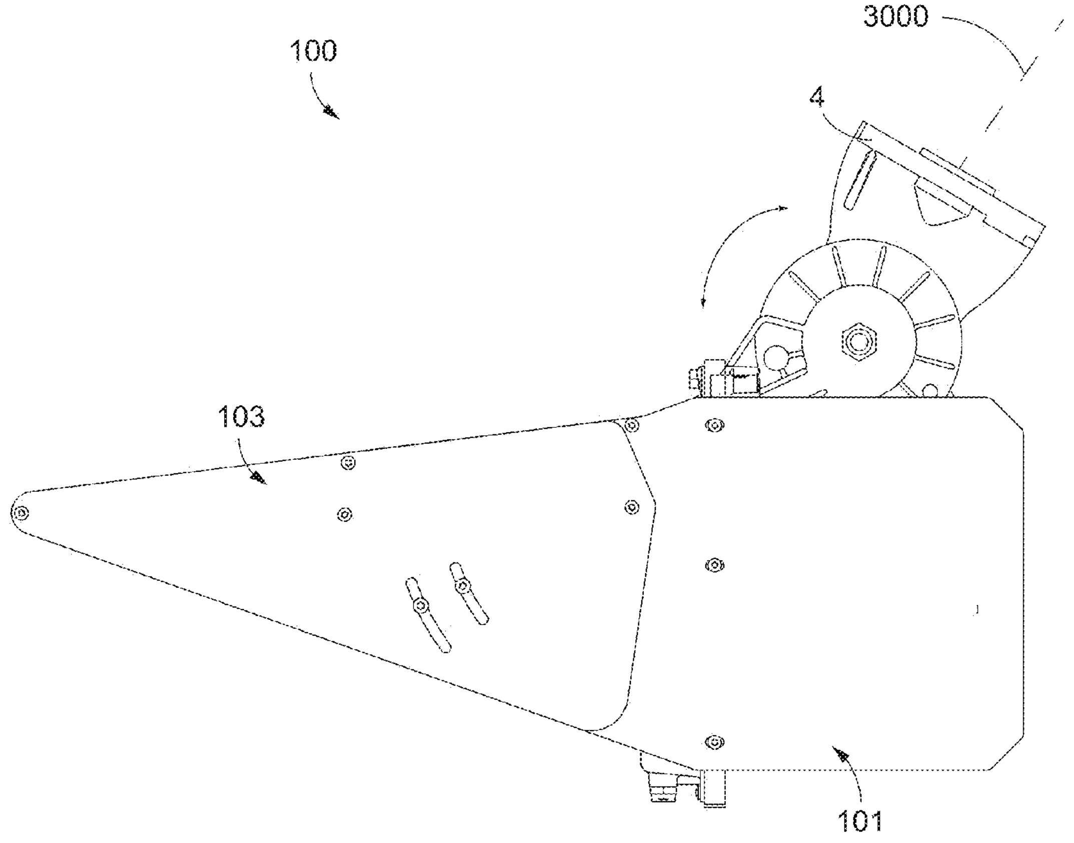
Figure 10:
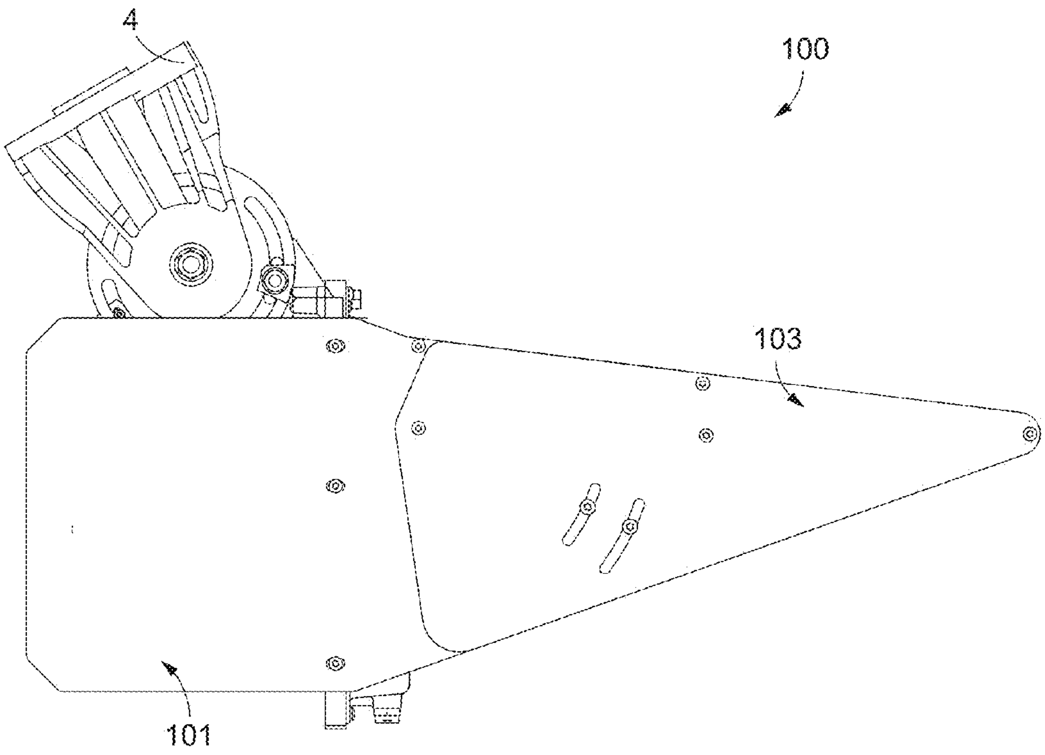
Figure 11:
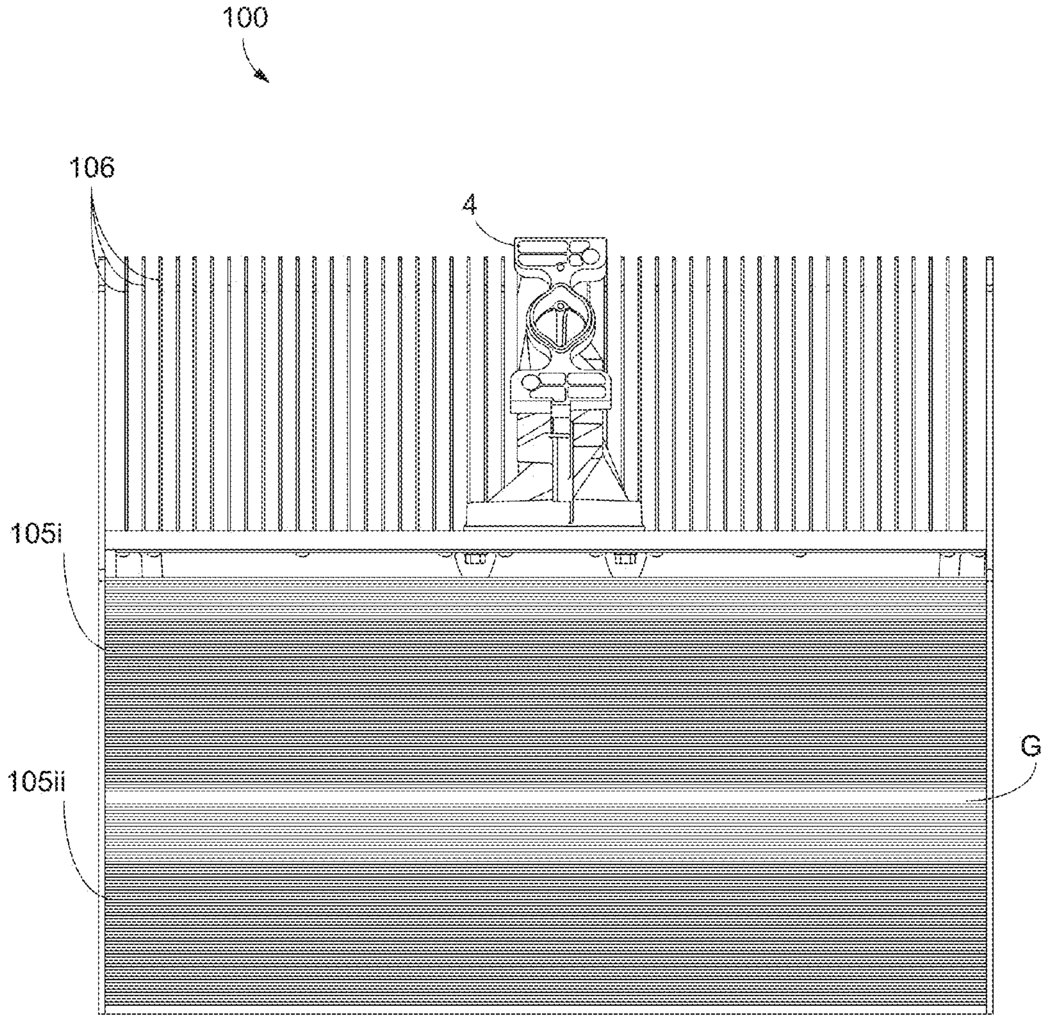
Figure 12:
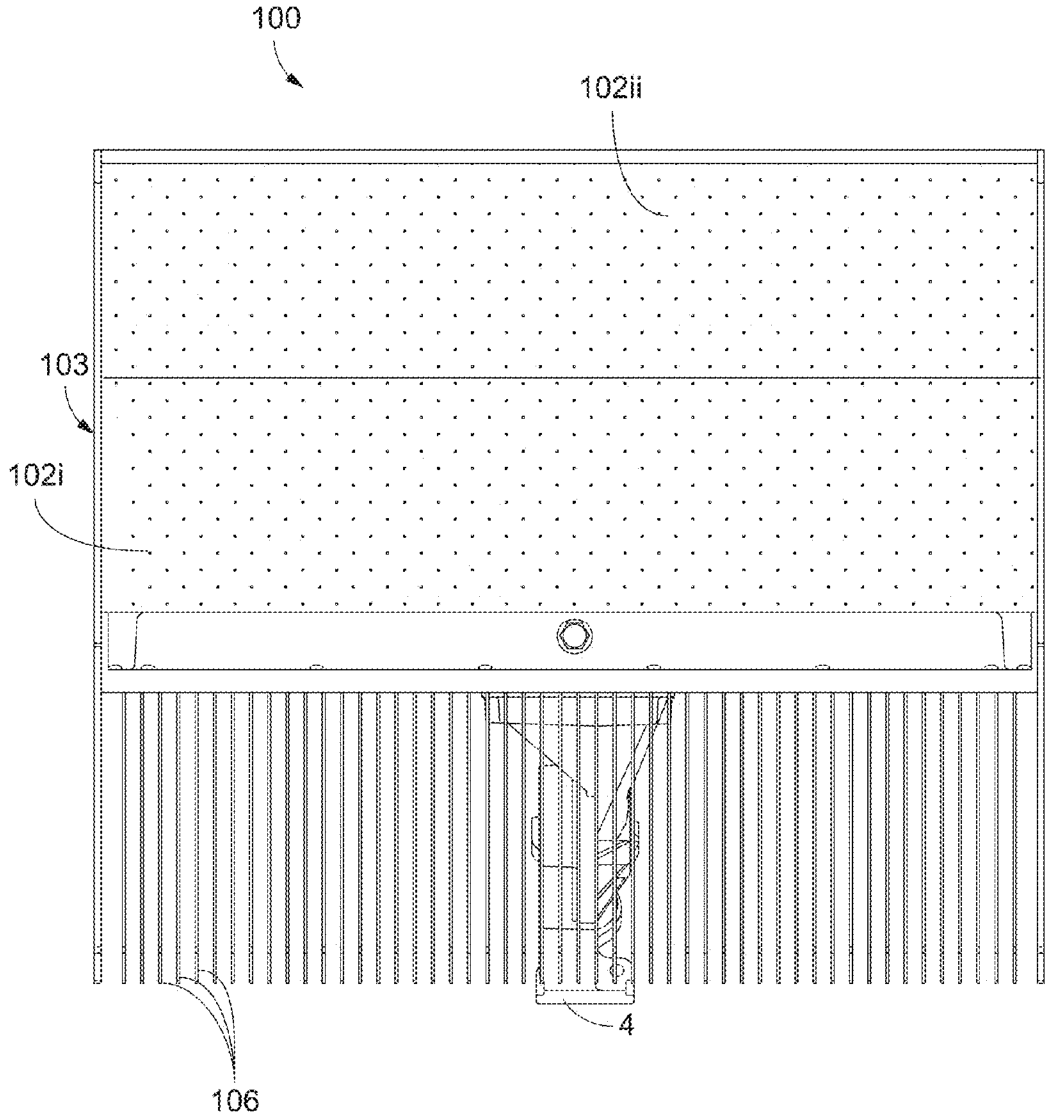

FIGS. 6-12 illustrate various views of the LED luminaire of FIGS. 4A and B as further modified according to aspects of the present invention; here including a multi-part external visoring system. FIG. 6 illustrates a perspective view, FIG. 7 illustrates a front view, FIG. 8 illustrates a back view, FIG. 9 illustrates a right side view, FIG. 10 illustrates a left side view, FIG. 11 illustrates a top view, and FIG. 12 illustrates a bottom view.

Figure 13A:
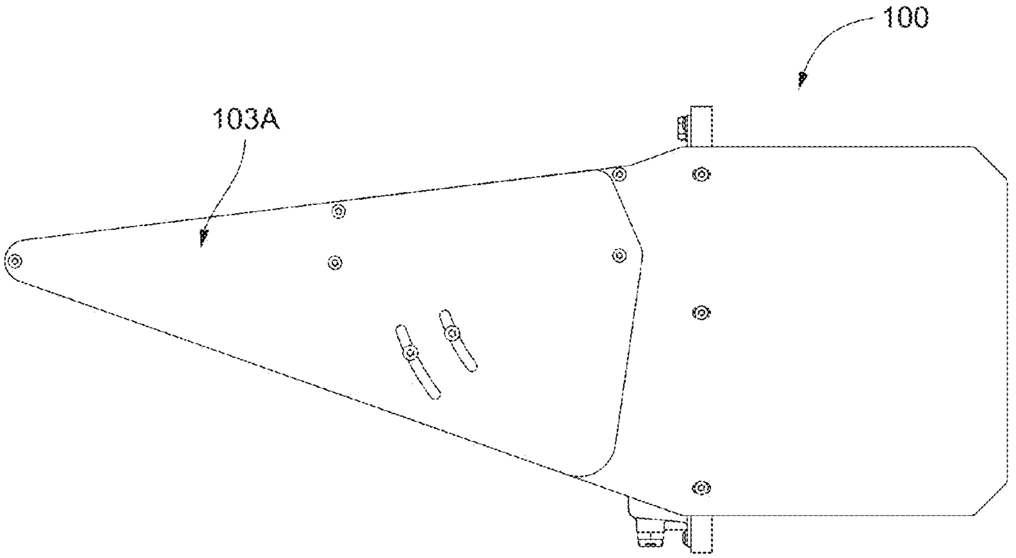
Figure 13B:
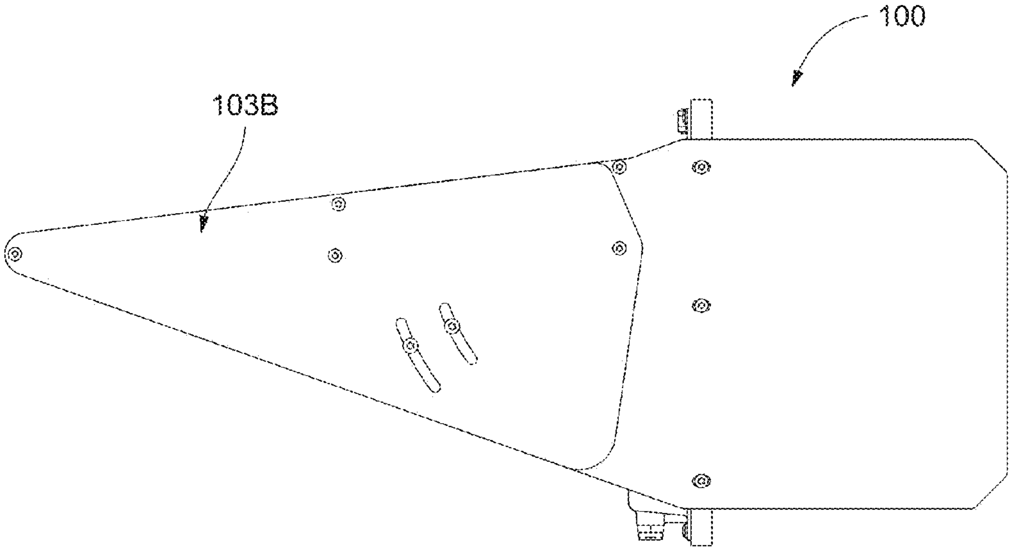

FIGS. 13A and B illustrate side views of the LED luminaire of FIGS. 6-12 with different fixed bottom surface visor portions 102*i*; here a pronounced curved version 102*i*A for a high quantity of light near the base of a pole (as an example) and a more generic Bézier surface 102*i*B to feather light back to the base of a pole (as an example).

Figure 14A:
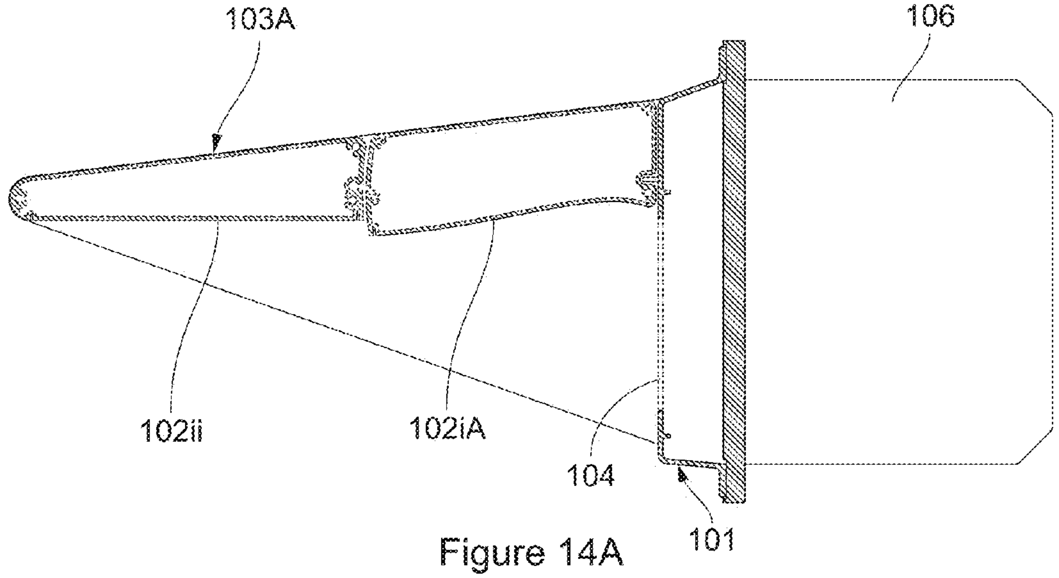

FIGS. 14A and B illustrate a section taken through the side views of FIGS. 13A and B, respectively, so to better illustrate the difference between the different fixed visor portions.

Figure 15A:
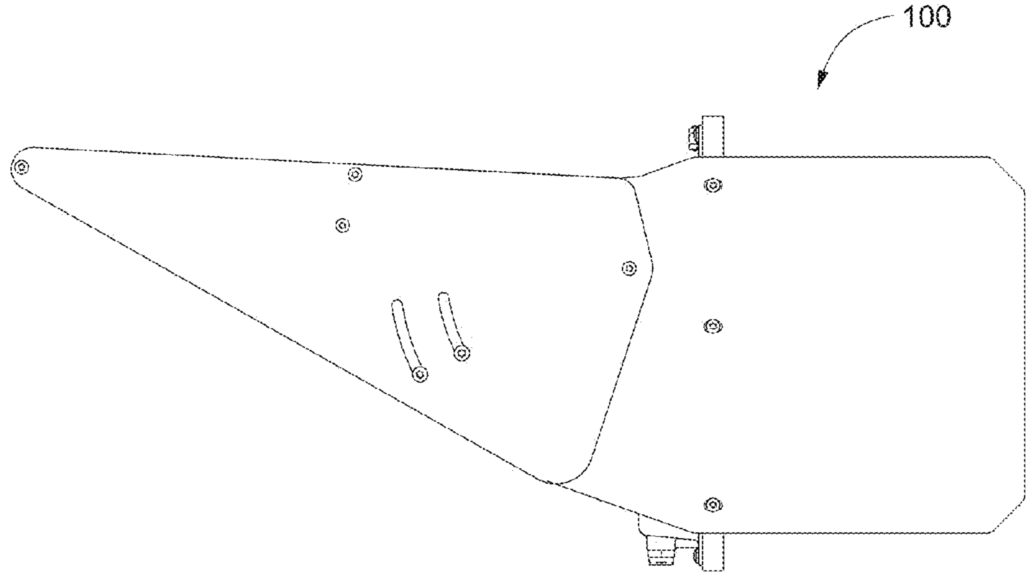

FIGS. 15A and B illustrate side views of the LED luminaire of FIGS. 6-12 with different orientations of the pivotable visor portion so to effectuate different beam cutoffs.

FIGS. 16A-D illustrates the different orientations of the pivotable visor portion of FIGS. 15A and B as applied to the LED luminaire of FIGS. 6-12 having the different fixed visor portions of FIGS. 13A-14B so to present four unique composite beams from a precision lighting design LED luminaire according to at least some aspects of the present invention.

Figure 17:
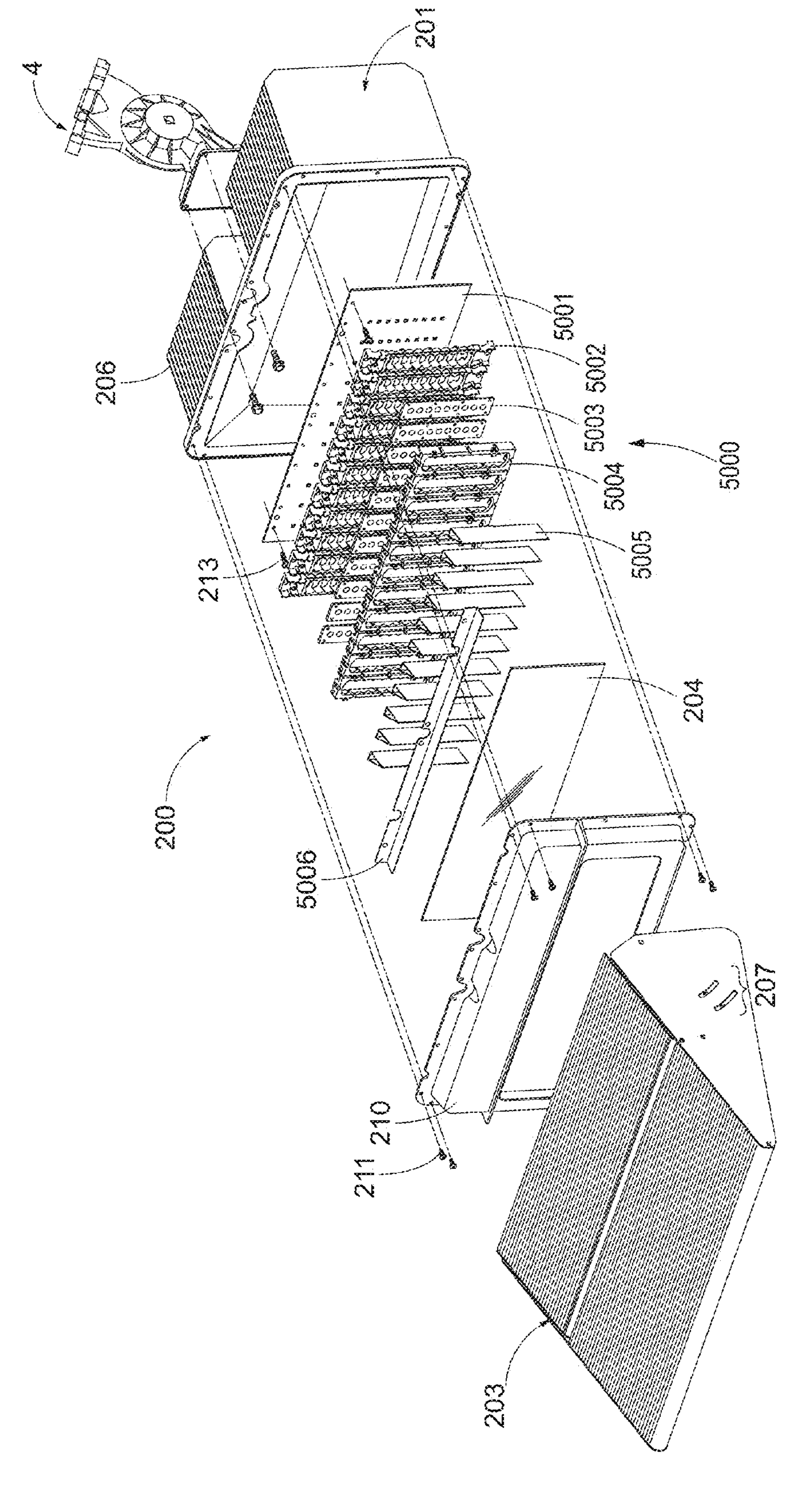

FIG. 17 illustrates a partially exploded perspective view of the LED luminaire of FIGS. 6-12 as further modified according to aspects of the present invention; here including a multi-part internal optic system. Note that secondary lenses are only generically rendered.

Figure 18:
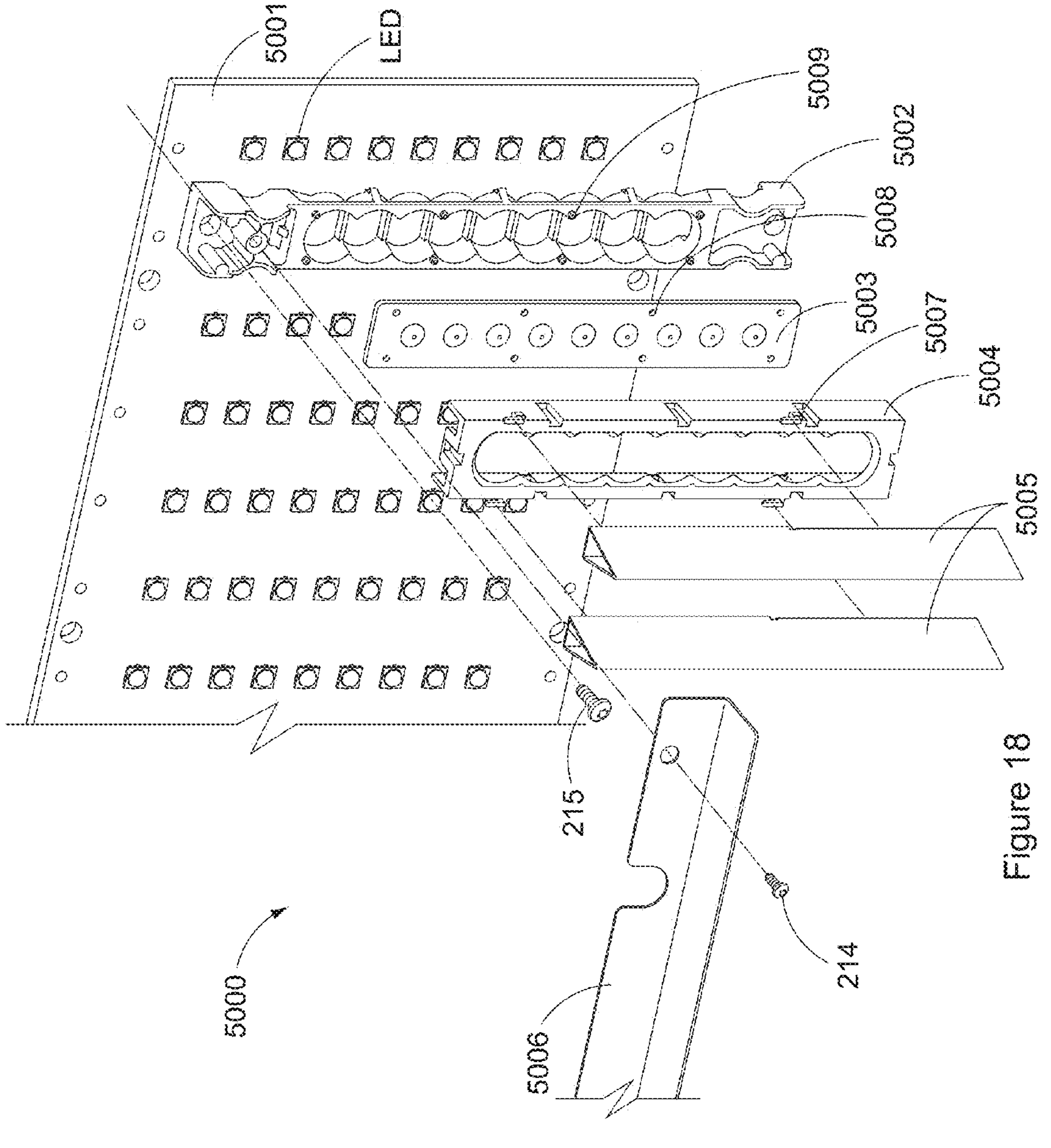
Figure 19:
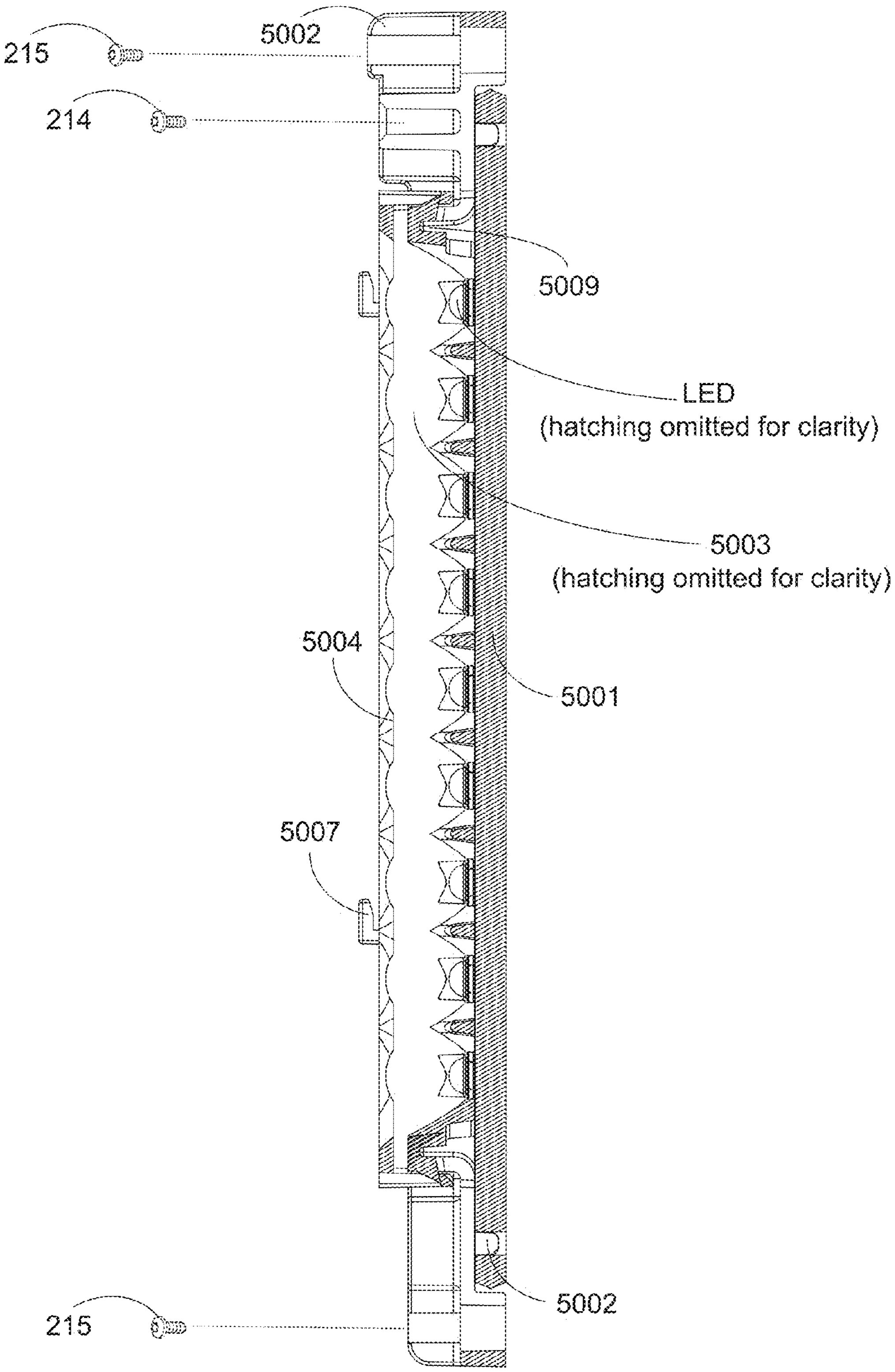

FIGS. 18 and 19 illustrate the multi-part internal optic system of FIG. 17 in greater detail. FIG. 18 illustrates a greatly enlarged portion of the partially exploded perspective view of FIG. 17, and FIG. 19 illustrates a greatly enlarged section view taken of a portion of the internal optic system when assembled and in isolation. Note that in FIG. 18 secondary lenses are only generically rendered.

Figure 20:
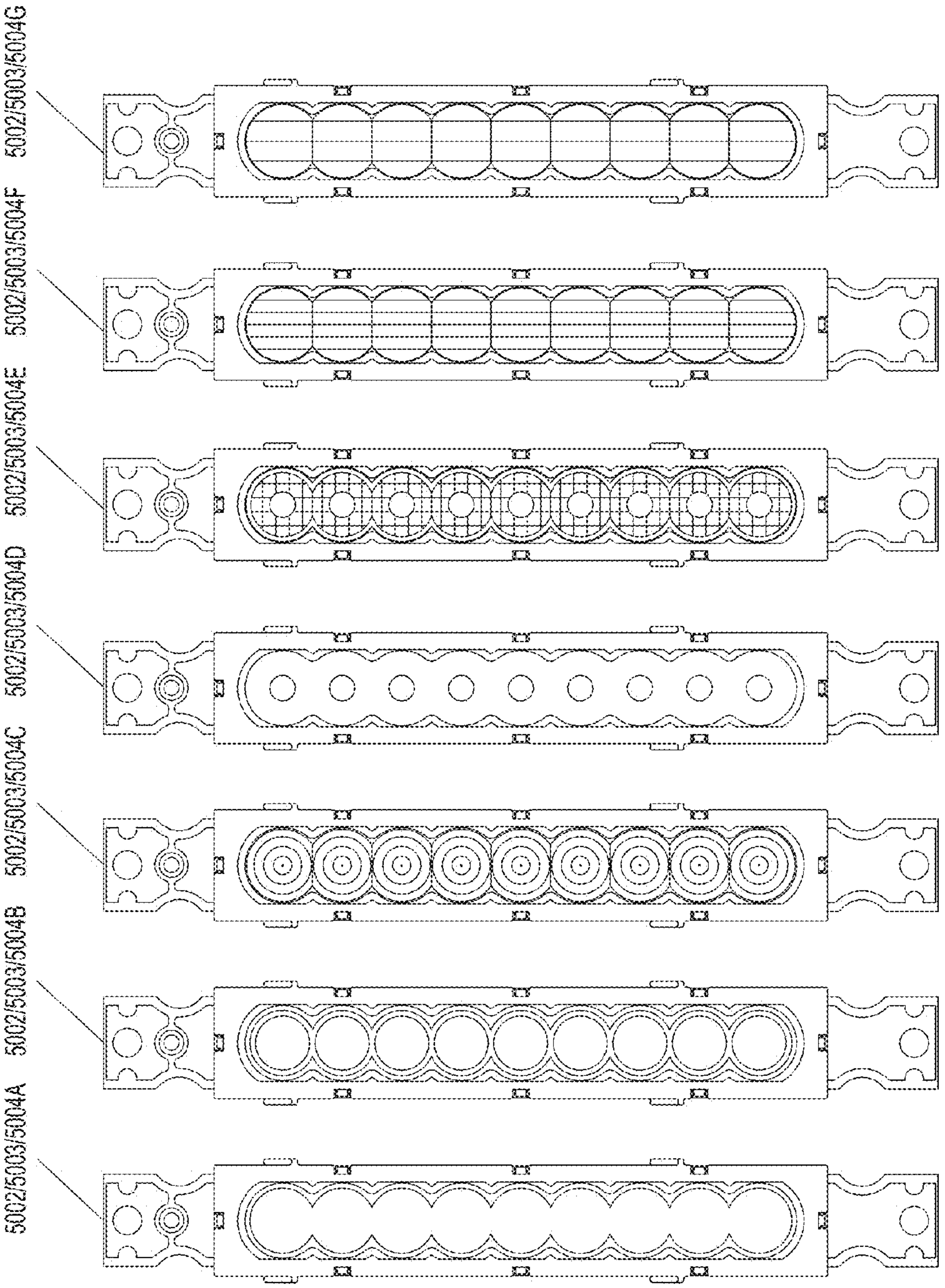

FIG. 20 illustrates various views of various designs of lenses for the internal optic system of FIGS. 17-19.

Figure 21A:
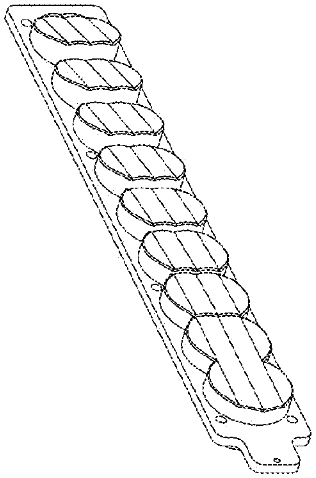
Figure 21F:
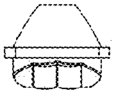
Figure 21G:
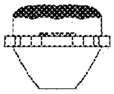
Figure 21B:
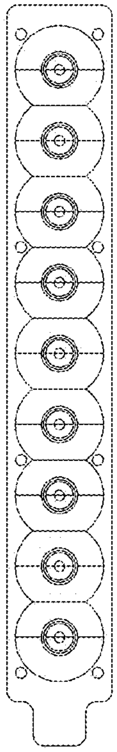
Figure 21C:
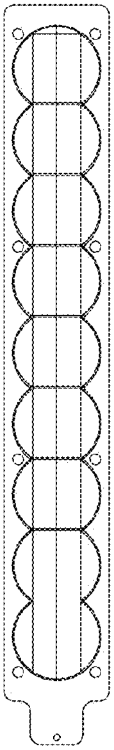
Figure 21D:
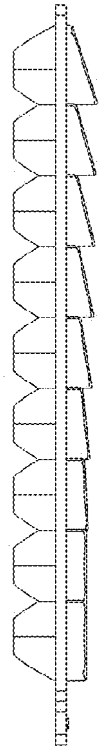
Figure 21E:
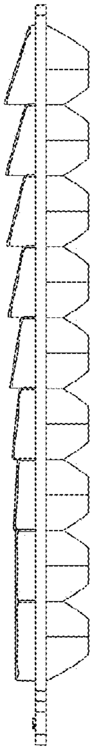

FIGS. 21A-G illustrate various views of an alternative design of lens for the internal optic system of FIGS. 17-19. FIG. 21A illustrates a perspective view, FIG. 21B illustrates a back view, FIG. 21C illustrates a front view, FIG. 21D illustrates a left side view, FIG. 21E illustrates a right side view, FIG. 21F illustrates a top view, and FIG. 21G illustrates a bottom view.

Figure 22:
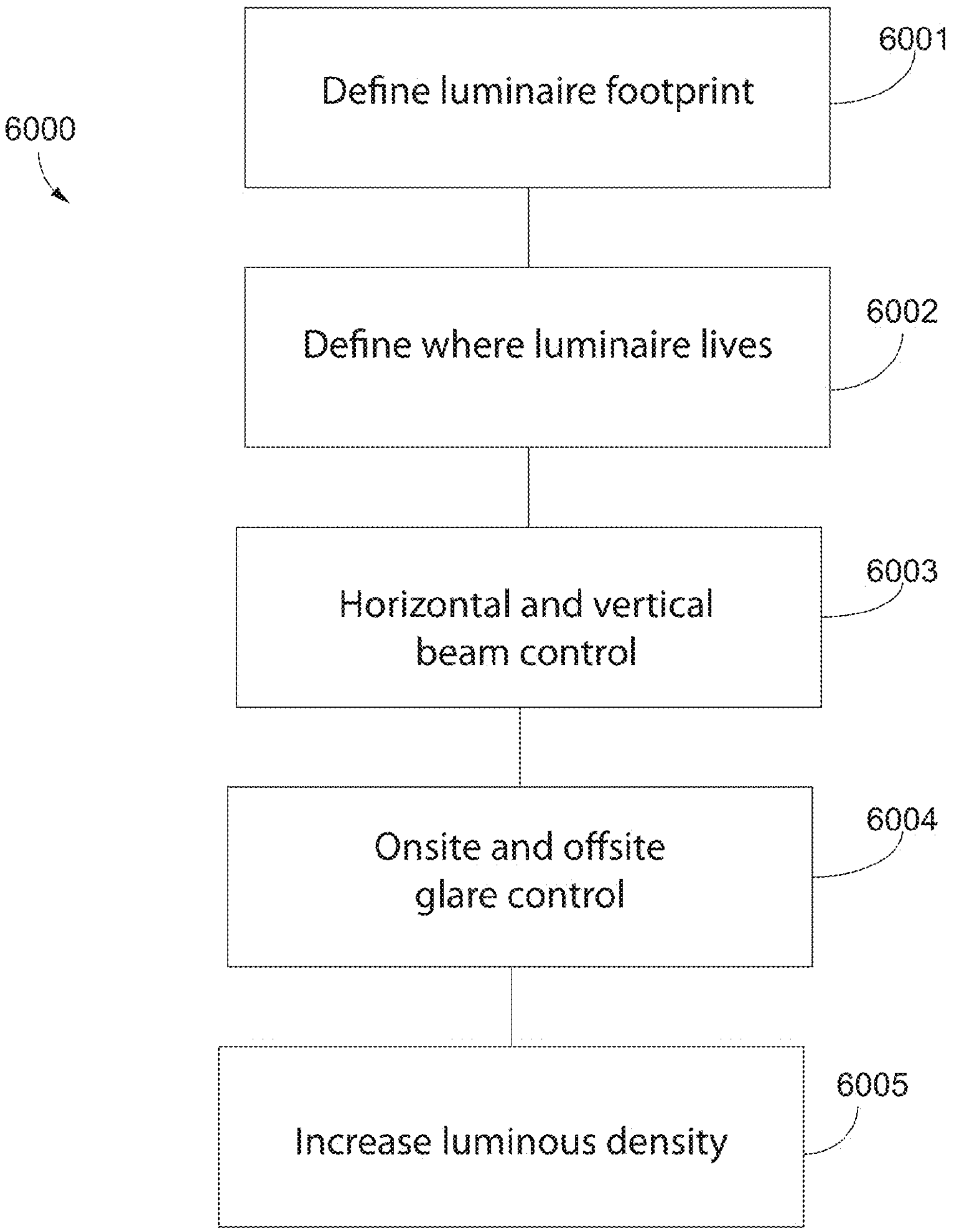

FIG. 22 illustrates one possible method of designing a precision lighting design LED luminaire according to aspects of the present invention.

Figure 23A:
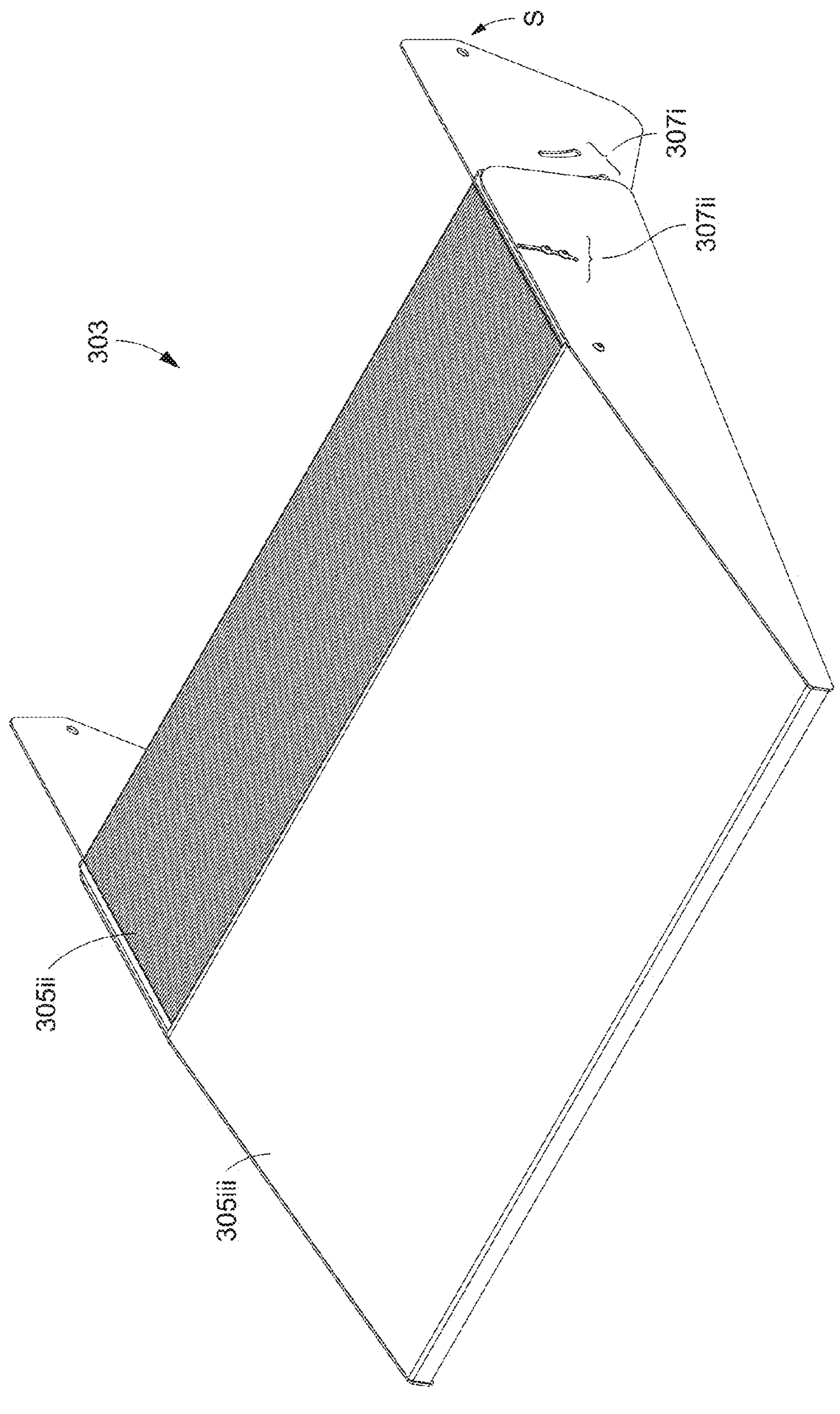
Figure 23B:
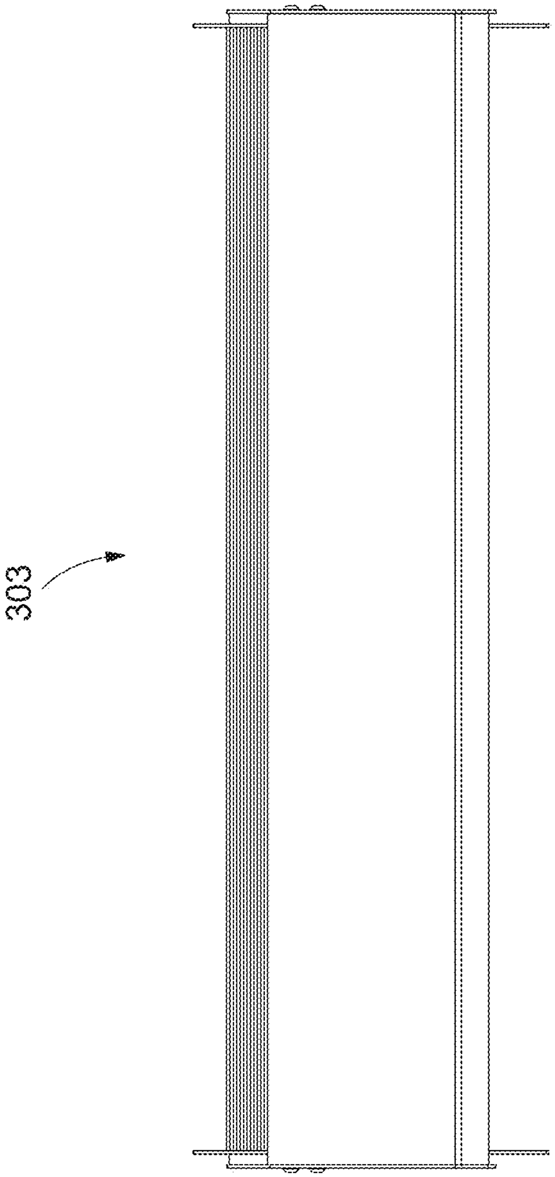
Figure 23C:
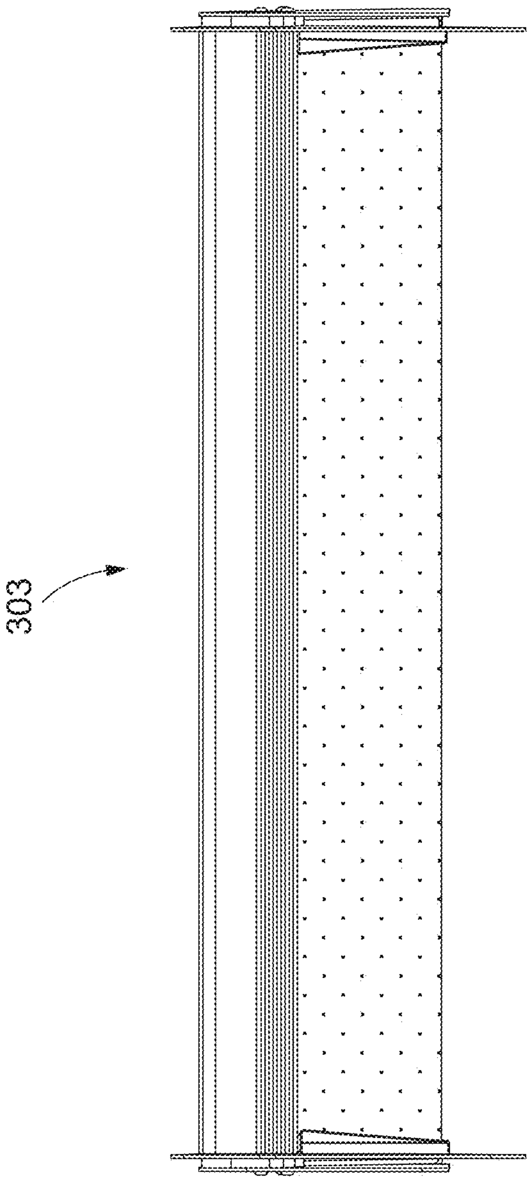
Figure 23D:
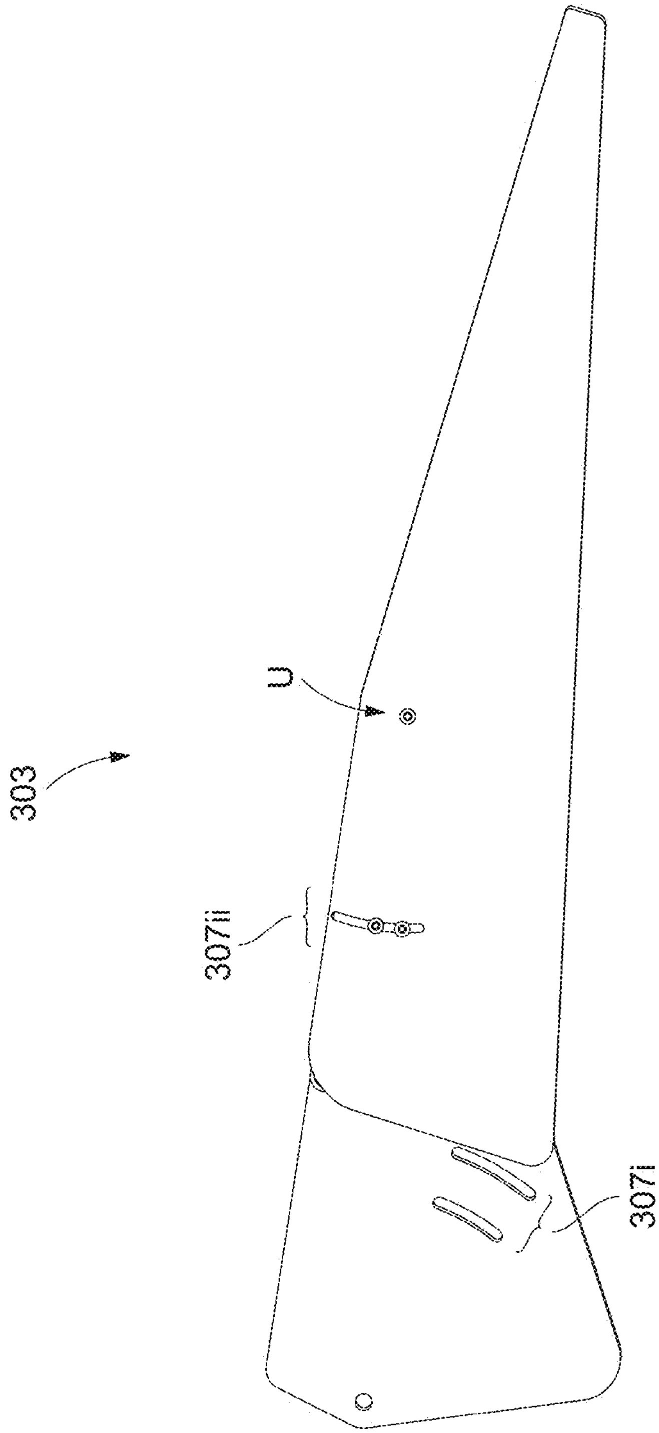
Figure 23E:
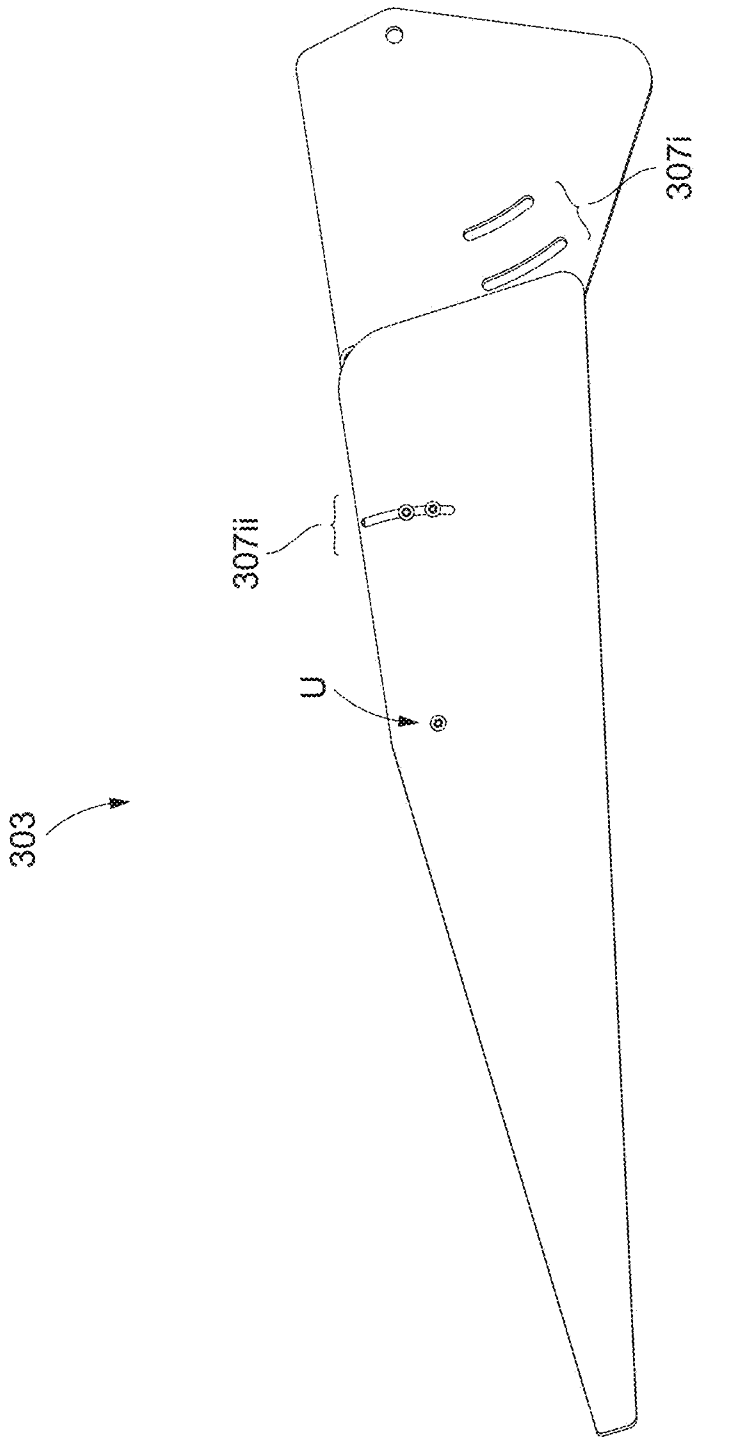
Figure 23F:
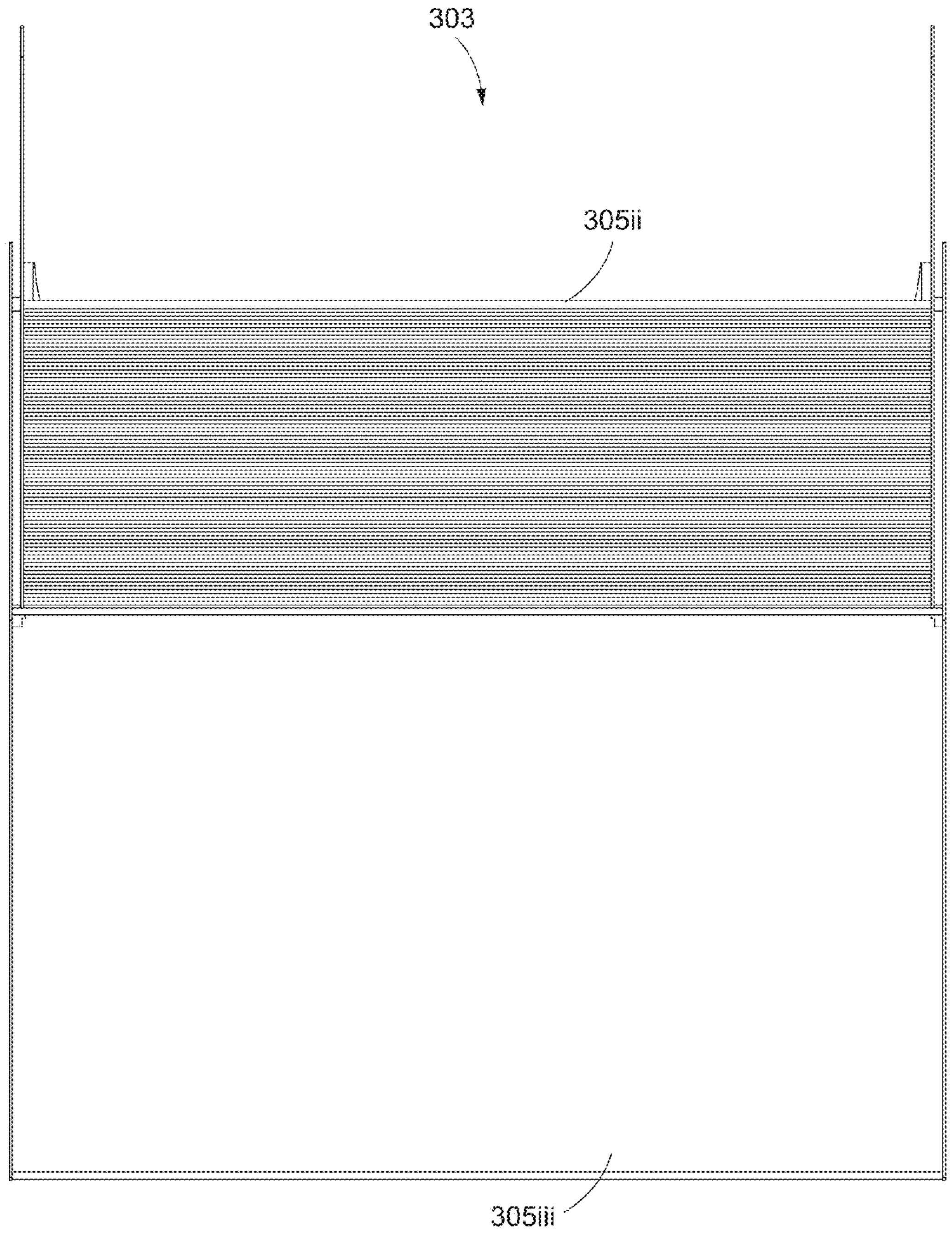
Figure 23G:
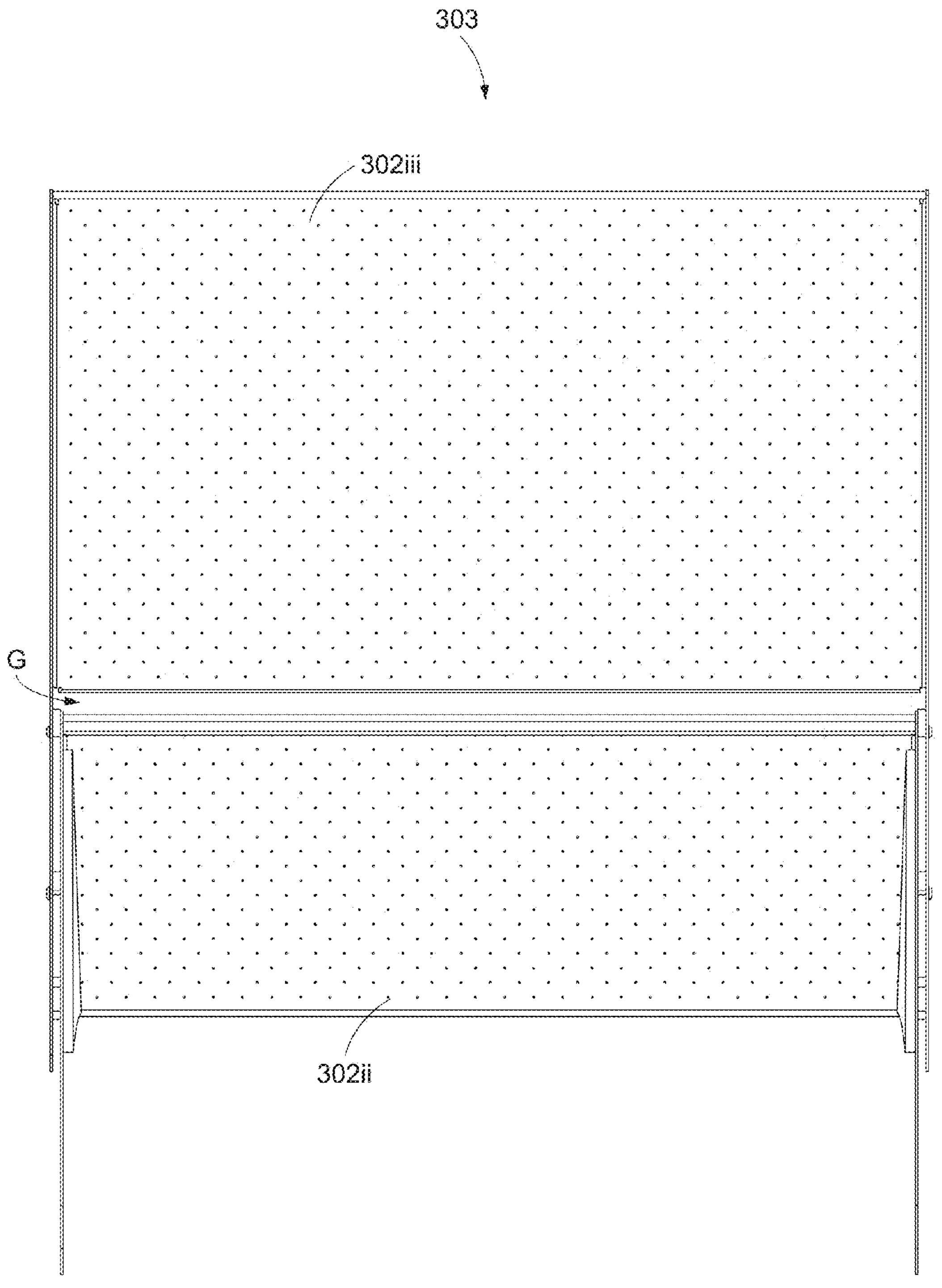
Figure 23H:
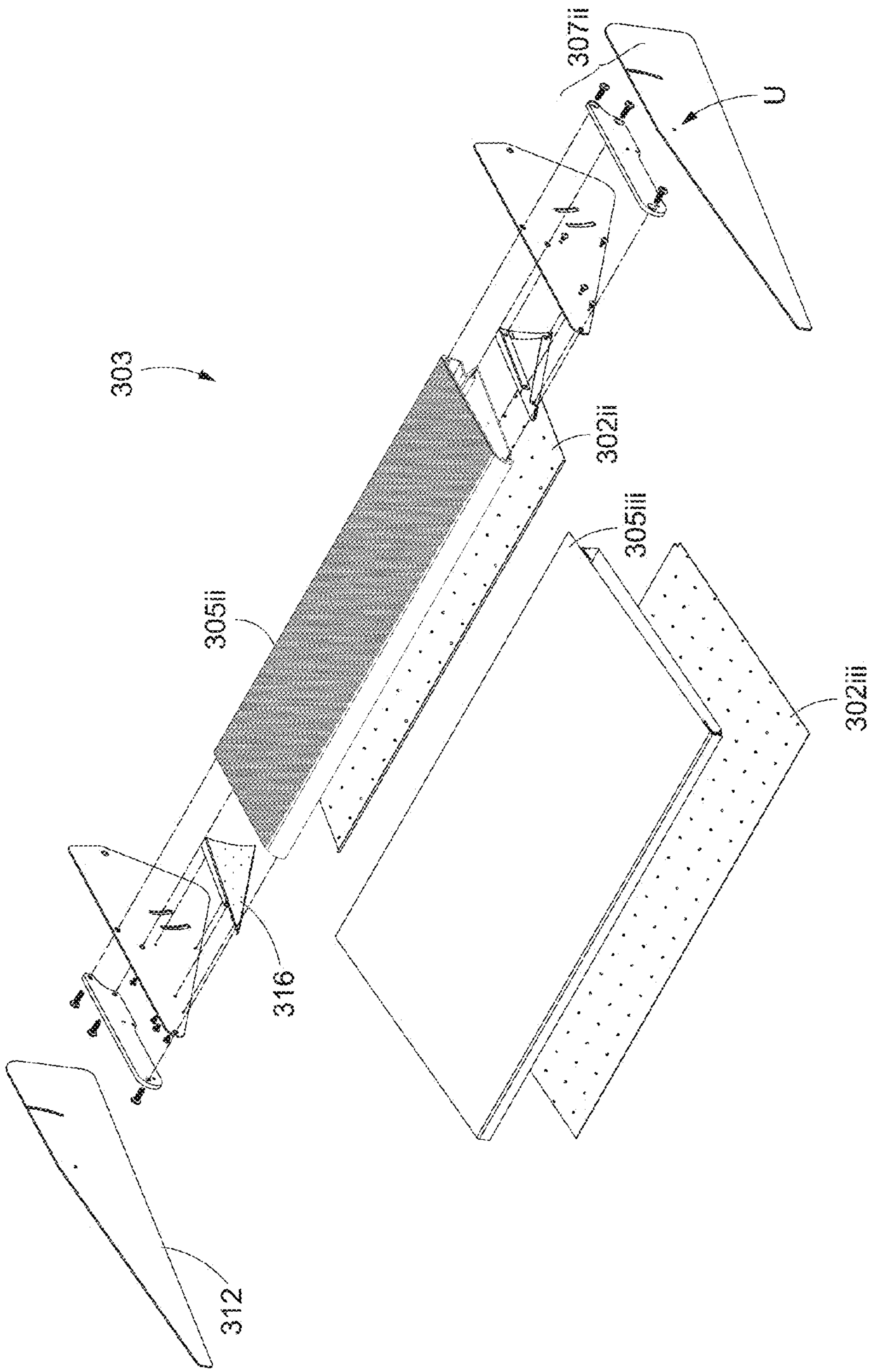
Figure 23I:
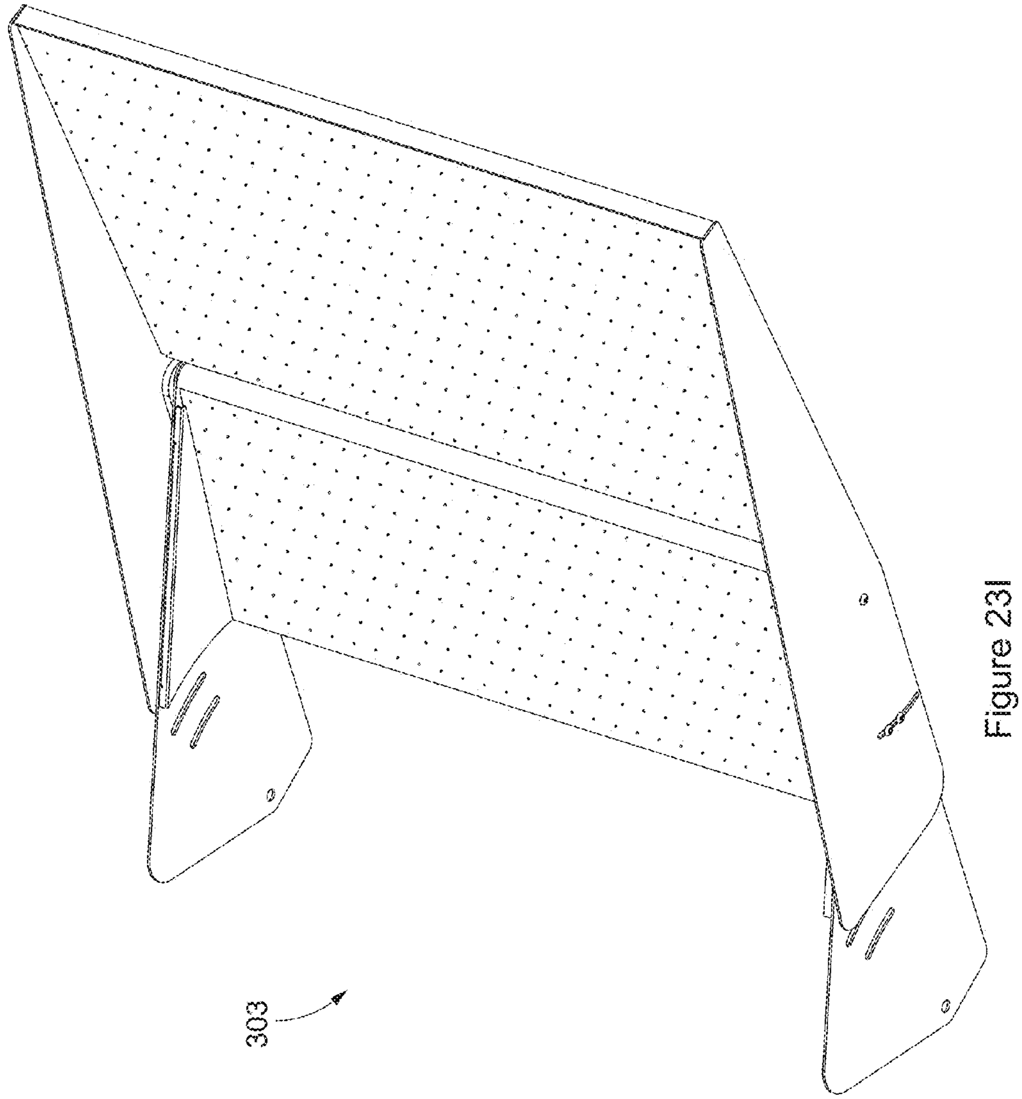

FIGS. 23A-I illustrate various views of an alternative design of visor for the external visoring system of FIGS. 6-12. FIG. 23A illustrates a perspective view, FIG. 23B illustrates a front view, FIG. 23C illustrates a back view, FIG. 23D illustrates a left view, FIG. 23E illustrates a right view, FIG. 23F illustrates a top view, FIG. 23G illustrates a bottom view, FIG. 23H illustrates a reduced in size exploded view of the perspective view of FIG. 23A, and FIG. 23I illustrates an alternative perspective view.

V. DETAILED DESCRIPTION OF EXEMPLARY EMBODIMENTS

A. Overview

To further an understanding of the present invention, specific exemplary embodiments according to the present invention will be described in detail. Frequent mention will be made in this description to the drawings. Reference numbers will be used to indicate certain parts in the drawings. Unless otherwise stated, the same reference numbers will be used to indicate the same parts throughout the drawings. Likewise, similar parts follow a similar numbering sequence. For example, a luminaire housing 81 for a state-of-the-art fixture might take on a new reference number 91 after a first iteration of fixture modification according to aspects of the present invention, a new reference number 101 after a second iteration of fixture modification according to aspects of the present invention, and so on. In each case said luminaire housing may or may not have been modified; regardless, a similar numbering convention is followed between iterations because the core functionality (i.e., housing the LEDs) is the same or similar between iterations.

Regarding terminology, as previously stated the terms "luminaire(s)" and "lighting fixture(s)", and "fixture(s)" are used interchangeably throughout; all of which are understood in the art of lighting design to be used interchangeably in the colloquial. The terms "light directing" and "light redirecting" devices are also used a number of times herein, and are generally understood to be devices internal or external (or both) to lighting fixtures which are adapted to in some way modify, shape, direct, redirect, or otherwise provide control of the beam issued forth (i.e., emitted) from said lighting fixture. Some non-exhaustive, non-limiting examples of light directing devices include: adjustable armatures or devices which move or pivot some portion of the lighting fixture, lenses, color gels, and phosphors. Some non-exhaustive, non-limiting examples of light redirecting devices include: visors, reflective rails or components, light absorbing rails or components, and diffusers. Any number of light directing and/or light redirecting devices could be used alone or in combination according to aspects of the present invention; some particularly synergistic combinations are set forth in the exemplary embodiments.

Further regarding terminology, the terms "horizontal" and "vertical" are used to describe particular directions of movement, pivoting, aiming, etc. It is important to note that what comprises horizontal as opposed to vertical should be taken in the context of operational orientation of the lighting fixture or device described and illustrated. That being said, the present invention is not limited to the operational orientations described and illustrated herein, nor to moving, pivoting, aiming, etc. solely in orthogonal planes. Aiming of a lighting fixture relative a target according to the present invention could include a wide range of aiming angles in all three dimensions—which is beneficial since some target areas require adequate illumination of not only a plane (e.g., a playing field) but also a space above the plane (e.g., the area of sky above a playing field where a hit ball may enter). Lighting of a space above a plane—whether or not to the same intensity level as that of the plane, whether from a low mounting position angling upward or from a high mounting position angling downward—is generally known as "uplighting".

Further regarding terminology, reference herein to a "lens" is generally intended to reference the secondary lens of an LED which already has a die and a primary lens; though, of course, this could differ if the LED does not already have a primary lens, the light source is something other than an LED (e.g., laser diode), or for other reasons. Lastly regarding terminology, "undesirable lighting effects" can mean a number of things in a lighting design. Some specific examples discussed herein include onsite glare, offsite glare, spill light, shadowing, hot spots, and center beam shift. Onsite glare refers to undesirable lighting effects as perceived by someone at the target area (e.g., a player) and offsite glare refers to undesirable lighting effects as perceived by someone outside the target area (e.g., a driver on a nearby road). Typically offsite glare is in reference to someone far removed from the target area (e.g., in a residence on a different property) rather than someone just outside the target area (e.g., in the parking lot adjacent to the athletic field), though this could differ. Spill light refers to any light that falls outside the target area irrespective of whether it produces perceived glare. Shadowing and hot spots—where the light intensity in a region of the target area is too low or too high, respectively—is generally due to physical or photometric interference of components of the lighting system and defined with respect to either lighting specifications or other regions of the target area, though this could differ. Center beam shift generally refers to the undesirable shifting of either the photometric center or maximum candela (or both, if colocated or proximate) due to either excessive pivoting of an entire fixture (e.g., via adjustable armature 4) or too severe an angle of a reflective visor relative the composite beam issued forth from the lighting fixture; as used herein, "center beam shift" refers to perceivable center beam shift (i.e., where shift is enough to perceivably impact beam shape or distribution).

The exemplary embodiments envision a multi-part visoring and optic system which addresses, among other things, fixture interaction within an array, avoiding undesirable lighting effects, and onsite and/or offsite glare control. By way of introduction, consider again the example of a sports lighting application; generic sports lighting systems and components thereof are illustrated in FIGS. 1A-F. A sports lighting application requires adequate illumination of a target area for the specific sport, at the specific level of play, under specific operating conditions. The target area can vary: instead of just a football field 5, it may include a few feet above the field so to illuminate advertisements on the front of stands 10; instead of just a baseball field 8, it may include tens of feet above the field so to adequately illuminate a ball along its entire trajectory; or the target area may not require any illumination of a space above a plane, but the plane itself is variably angled or meandering (as in the plane of racetrack 11). These target areas—and there can be more than one target area per lighting application—are each associated with onsite glare, offsite glare, spill light, and other undesirable lighting effects. To provide a degree of beam control that at least somewhat avoids undesirable lighting effects given limitations to fixture setback and mounting height (e.g., due to positions of stands 10) one must carefully coordinate aiming of each luminaire 2 (e.g., via adjustable armature 4) with any number of luminaires 2 in an array 1 of luminaires mounted to a pole or other support structure (e.g., via a common crossarm 7), and with pole height (note the relative height of pole 6 with a large portion above ground and a small base portion 16 which is underground as compared to pole 6 of the racing scenario in which fixtures 2 are mounted close to ground 13). In the current state of the art, all luminaires 2 on a common pole 6 are typically wired in the same manner—see electrical power source 3 with power wiring 9 to a distribution cabinet 14 with further power wiring 9 to each pole's local power cabinet 15 where power wiring 9 is run up pole 6, crossarm 7, and adjustable armature 4 (all of which are substantially hollow) such that power connections may be made at each fixture 2. Aiming of each luminaire 2 is typically only concerned with how each individual luminaire is aimed relative the target area, but this can lead to undesirable lighting effects and other issues best illustrated in FIGS. 2A-C.

As can be seen in FIG. 2A, when a fixture 2 comprises a plurality of light sources (e.g., several LEDs) each light source produces a beam output 310 which collectively form a composite beam pattern 300; note that for illustrative purposes only a few beam patterns 310 are illustrated, and all are illustrated as more-or-less round beam patterns (though this may differ in actual practice). One fixture 2 in isolation may produce onsite glare, offsite glare, and spill light (which are later discussed), but will not typically produce shadowing or have physical limitations which prevent producing a desirable composite beam. Consider now the addition of a second fixture mounted to a common crossarm 7; FIG. 2B. Here a composite beam pattern 320 includes individual beam outputs 310 from both fixtures 2W and 2Y; again, only a few beam patterns 310 are illustrated, and all are illustrated as more-or-less round beam patterns (though this may differ in actual practice). If one does not consider where the lighting fixture "lives" on pole 6 (i.e., the physical space a fixture occupies at all possible aiming orientations and relative all other components on said pole) a number of things can happen. Firstly, as can be seen when fixtures 2W and 2Y are pivoted horizontally (see fixtures 2X and 2Z, respectively, shown in broken line), they can physically interfere with one another or with the crossarm (see point P)—this limits possible aiming orientations and the ability to produce composite beam 320.

When lighting fixtures interfere with one another—either physically as in FIG. 2B or photometrical (e.g., when individual beams 310 are not overlapped appropriately)—shadowing and hot spots can occur. It is important to note, though, interference is not restricted to a single plane. Similar or other undesirable lighting effects can occur in the vertical plane when one does not consider how a fixture in an array interacts with fixtures higher or lower in the array, as well as how said fixture interacts with other features such as crossarms and poles; this is illustrated in FIG. 2C.

With respect to FIGS. 2C (and 2B), onsite glare can be produced when someone at the target area (e.g., a player) perceives a light source as disturbingly bright or causing discomfort, or otherwise impacting the ability to complete a task (e.g., catching a ball). While the exact metric for measuring onsite glare is not relevant at this stage in the discussion, what is relevant is noting the areas most commonly of concern. A player looking directly at a fixture 2 (e.g., if pivoting of armature 4 places fixture 2 directly in the line of sight of a player) may perceive glare due to an internal fixture glow (often referred to as "haze")—see points R of FIG. 2C. Internal fixture glow occurs when light is trapped within the fixture instead of transmitted out of (i.e., issued forth from) the fixture and towards a target area. Onsite glare can also be perceived if light from a fixture strikes a pole or crossarm instead of the target area—this is indicated at point T of FIG. 2C.

Light at point T is often also viewable from off site, thereby also causing offsite glare. Furthermore, at an offsite location a viewer is often adapted to a much lower light level, and so a less intense light than that seen by a player could be perceived as causing glare to someone far from the playing field. As such, light from a fixture higher in an array could produce glare as perceived from off site when even a small amount of light strikes the top of a lighting fixture lower in the array; this is illustrated at point Q of FIG. 2C.

Onsite and offsite glare can occur when a lighting designer fails to take into consideration how all parts of a lighting system exist in a space, but it is important to note that onsite and offsite glare can also occur when everything has been designed and aimed correctly—purely due to a lack of tools for beam control—and so a state-of-the-art LED lighting fixture designed for precision lighting may still benefit from aspects of the present invention. One such state-of-the-art LED lighting fixture 80 (FIGS. 3A and B), which forms the platform from which the specific embodiments are built, generally comprises a housing 81 which includes a generally hollow and thermally conductive body (see heat fins 86) and an opening thereto against which is sealed a light transmissive material 84 (e.g., anti-reflective coated glass). Housing 81 is generally affixed to crossarm 7 or other device (not illustrated) via an adjustable armature 4 such as that described in U.S. Pat. No. 8,770,796 hereby incorporated by reference in its entirety, or otherwise. In the generally hollow space of housing 81 exists some number of LEDs in combination with, at a minimum, one or more light directing devices so to direct a majority of light out light transmissive material 84 (thereby mostly preventing the aforementioned haze). Affixed to or generally proximate to housing 81 is a visor 83 having a top side 85 not in the path of the composite beam (but prone to producing the aforementioned offsite glare when stacked in an array) and a bottom side 82 which is typically reflective (though may be light absorbing) which is pivoted into at least a portion of the composite beam issued from the fixture via pivoting structure 87 to effectuate beam cutoff; pivoting structure 87 may be such as that described in U.S. Patent Publication No. 2013/0250556, now U.S. Pat. No. 9,631,795 issued on Apr. 25, 2017, hereby incorporated by reference in its entirety, or otherwise. Throughout the drawings the dotted surfaces (such as FIGS. 2A, 2B, 3B, 4B, 12, 23C, 23G, 23H, and 23I) are intended to indicate some type of range of reflectivity from highly specular to diffuse to light absorbing, or combinations thereof and not any structural features.

B. Exemplary Method and Apparatus Embodiment 1

A more specific exemplary embodiment for improved beam control, utilizing aspects of the generalized example described above, will now be described. The present embodiment addresses issues common in the art of precision lighting design—namely, fixture interaction within an array, avoiding undesirable lighting effects, and providing onsite and/or offsite glare control—in a lighting fixture designed to be luminously dense with sharp beam cutoff; this is achieved through a multi-part visoring and optic system which is presently discussed.

Ribbing on External Visor

As previously stated, offsite glare can occur when light from a lighting fixture higher in an array of lighting fixtures strikes the top of a lighting fixture lower in the array of lighting fixtures. As such, state-of-the-art LED lighting fixture 80 is modified so to include ribbing on top side 85 of visor 83; the result is LED lighting fixture 90 of FIGS. 4A and B. As can be seen from FIGS. 4A and B, aside from ribbed top surface 95, all other components of the lighting fixture are the same (e.g. parts 90, 91, 92, 93, 94, 95, 96, and 97 correlate to parts 80, 81, 82, 83, 84, 85, 86, and 87, respectively). Similarly, parts in the reference numbers 100's, 200's and 300's correlate in similar ways). Since light is striking the top of a fixture, it is unlikely said light can be harnessed to be useful (i.e., to illuminate the target area), and so ribbing on visor 93 is not designed to redirect the small portion of overall light striking it, but rather, to trap it so to minimize offsite glare. It is possible ribbing on visor 93 could be blackened so to also absorb said small portion of light striking it, but doing so (i) requires additional processing steps and cost, (ii) may produce a lighting fixture which has a disagreeable aesthetic (particularly if the rest of the lighting fixture is a different color), and (iii) will likely dull in perceived color as dust accumulates over time. As such, no special processing steps were taken, and all ribbing tested was extruded aluminum alloy material so to mimic what would likely be available in a production setting.

FIGS. 5A-E illustrate different designs of ribbing 2000A-2000E which were tested for potential use on ribbed top surface 95; dimensions are reported in Table 1 (all dimensions other than angles are in inches).

TABLE 1

| Design | $H_1$ | $H_2$ | $D_1$ | $D_2$ | α |
|---|---|---|---|---|---|
| 2000A | 0.10 | 0.15 | 0.08 | 0.08 | — |
| 2000B | 0.10 | 0.15 | 0.08 | 0.08 | 45° |
| 2000C | 0.10 | 0.17 | 0.16 | 0.16 | — |
| 2000D | 0.10 | 0.24 | 0.17 | 0.17 | 45° |
| 2000E | 0.10 | 0.23 | 0.30 | 0.30 | — |

Three series of tests were performed to determine a relative level of perceived offsite glare using luminance as the relevant metric; all tests used a control sample which was flat and similar to surface 85 of FIG. 3A. All tests were performed with the same light source at the same drive current and position (e.g., a few inches directly above and aiming directly down at the sample). All luminance measurements were taken straight on (i.e., directly facing the central aiming axis of the lighting fixture in a neutral/unaimed position). Since experience has shown that while offsite glare can come from a number of places and a number of directions the most impactful for purposes of an offsite viewer experiencing glare is when a lighting fixture is panned (i.e., tilted left or right along a horizontal plane via armature 4—see the double-headed arrow in FIG. 7 and pivot axis 3000 in FIG. 9) up to 60° or tilted (i.e., tipped upward or downward along a vertical plane—see the double-headed arrow in FIG. 9 and pivot axis 4000 in FIG. 7) up to 40°, conditions that reflected these real world observations were tested. The one exception is that tilting upward was disregarded from testing as it would tip surface 85/95 away from and out of sight of an offsite viewer.

Table 2 below details testing in footlamberts using a 1-degree luminance meter (model Mayo-Spot 2 available from Gossen Photo and Light Measurement GmbH, Nürnberg, Germany); Table 3 below details testing in footlamberts using a 1-degree luminance meter (model 301664 available from Minolta Camera Company Ltd. (now Konica Minolta Sensing Americas, Inc., Ramsey, N.J., USA)); and Table 4 below details testing in candela/sq. meter using a ⅓-degree luminance meter (model 501457 available from Minolta Camera Company Ltd. (now Konica Minolta Sensing Americas, Inc., Ramsey, N.J., USA)).

TABLE 2

| Test Condition | 2000A | 2000B | 2000C | 2000D | 2000E | Control (flat surface) |
|---|---|---|---|---|---|---|
| fixture panned 45° | 52 | 82 | 62 | 57 | 122 | 214 |
| fixture panned 60° | 55 | 74 | 54 | 52 | 109 | 187 |
| fixture tilted 10° | 42 | 62 | 36 | 38 | 106 | 216 |
| fixture tilted 30° | 148 | 163 | 85 | 72 | 320 | 670 |
| fixture tilted 40° | 31 | 45 | 27 | 31 | 59 | 125 |
| Relative percentage for worst case | 22% | 24% | 13% | 11% | 48% | 100% |
| Relative average over all test states | 23% | 30% | 19% | 18% | 51% | 100% |

As can be seen from Table 2, ribbing design 2000D had the lowest recorded footlamberts as compared to the control for both the worst case scenario and overall average.

The test performed in Table 3 was a repeat of the worst case scenario using a different luminance meter to confirm the results recorded in Table 2 were reasonable; as can be seen from Table 3, test results are similar to that of Table 2 and ribbing design 2000D shows the best result (i.e., least amount of recorded photometric brightness).

TABLE 3

| Test Condition | 2000A | 2000B | 2000C | 2000D | 2000E | Control (flat surface) |
|---|---|---|---|---|---|---|
| fixture tilted 30° | 120 | 131 | 73 | 63 | 280 | 600 |
| Relative percentage for worst case | 20% | 22% | 12% | 11% | 47% | 100% |

The test performed in Table 4 was a repeat of the worst case scenario using a different luminance meter to confirm the results recorded in both Tables 2 and 3 were reasonable; as can be seen from Table 4, test results are similar to that of Tables 2 and 3 and design 2000D shows the best result (i.e., least amount of recorded photometric brightness).

TABLE 4

| Test Condition | 2000A | 2000B | 2000C | 2000D | 2000E | Control (flat surface) |
|---|---|---|---|---|---|---|
| fixture tilted 30° | 278 | 330 | 200 | 185 | 633 | 1390 |
| Relative percentage for worst case | 20% | 24% | 14% | 13% | 46% | 100% |

So it can be seen that over the conditions tested ribbing design 2000D sets forth a preferred design of ribbing to be applied to the top surface of an external visor so to minimize offsite glare which results from light from a different lighting fixture in an array striking said surface. Extruding the part as a whole from aluminum or aluminum alloy (i) ensures integrity of thermal dissipation paths for the LED sources (as compared to using plastic as in some prior art approaches), and (ii) avoids unnecessary processing or assembly steps (as compared to affixing a sheet of ribbing material to a flat visor). It is estimated that for an LED luminaire such as that in FIGS. 4A and B having an external visor on the order of 25"×7", an investment of only 0.2 lbs of material will be needed for ribbing pattern 2000D—for a reduction in perceived offsite glare on the order of 80% as compared to the prior art fixture of FIGS. 3A and B.

Multi-Part Visor

While a degree of beam control is provided via adjustable armature 4 and a pivotable external visor 95, more can be done to provide sharper cutoff, increase useful light, and reduce undesirable lighting effects such as center beam shift. To that end, LED luminaire 90 is further modified such that the pivotable visor is divided into a fixed portion (i.e., stationary proximate the housing) and a pivotable portion (i.e., independently pivotable from the rest of the external visor and/or housing); see LED luminaire 100 of FIGS. 6-12. More specifically, FIG. 11 illustrates a fixed ribbed top surface 105*i* which is proximate the housing, a pivotable ribbed top surface 105*ii* which is proximate 105*i* (and distalmost from the housing), and a small portion at point G is not at all ribbed so to permit a full range of pivoting without interference from ribbing; said pivoting permits more or less (as desired) of a pivotable reflective bottom side 102*ii* (FIG. 12) to enter the plane of the composite beam issued forth from the fixture.

Sharper cutoff is provided, as one example, by permitting a wider range of aiming angles for the distalmost tip of visor 103 than is permitted by conventional one-piece visors when one takes into account minimizing center beam shift (which has been previously described). Conceptually, a visor could start in a more-or-less neutral position (see FIGS. 3A and B) and be tipped downward so to avoid spill light (see FIGS. 1A-C of aforementioned U.S. Patent Publication No. 2013/0250556, now U.S. Pat. No. 9,631,795 issued on Apr. 25, 2017) but beyond a critical angle (which here is defined as 90° from the face of light transmissive material 104 at the topmost point of the top row of secondary optics in a stacked array of LEDs/optics—see FIG. 19) additional tipping shifts the center beam. However, the critical angle for providing sharp cutoff is defined here by the angle between the distal tip of the external visor and the bottommost point of the bottommost row of secondary optics in a stacked array of LEDs/optics—see FIG. 19). So it can be seen how it is beneficial to restrain roughly the first half of the reflective surface of an external visor (i.e., the half proximate the housing—102*i*) to maintain a center beam position (e.g., to provide a reference for computerized lighting design), while providing for a pivotable second half of said reflective surface of the external visor to allow for sharper cutoff. For sports lighting applications, the pivotable portion of visor 103 is designed to pivot 12° upwardly and 6° downwardly at a total visor length of 8 inches when the lighting fixture is aimed 30° down from horizontal at a mounting height of approximately 70 feet and having 224 LEDs arranged in a 9×25 array (one center LED missing to balance the load of the multiple serially-wired strings to the drivers), though this is by way of example and not by way of limitation. Aside from the aforementioned, all other components of the lighting fixture are the same (e.g. parts 100, 101, 102, 103, 104, 105, 106, and 107 correlate to parts 90, 91, 92, 93, 94, 95, 96, and 97).

However, the present invention contemplates even greater possible beam control.

FIGS. 13A and B illustrate side views of what appears to be the same fixture; however, FIGS. 14A and B (which illustrate FIGS. 13A and B, respectively, with a portion removed) reveal different curvatures of fixed reflective bottom side 102*i* portion of visor 103; pivotable reflective bottom side 102*ii* portions are the same. Visor 103A includes fixed reflective bottom side 102*i*A which has a pronounced curvature near light transmissive material 104, and is designed to direct more light near the base of a pole to which the luminaire is affixed. Visor 103B includes fixed reflective bottom side 102*i*B which is more of a generalized Bézier surface, and is designed to feather light back towards a pole to which the luminaire is affixed. Both 102*i*A and 102*i*B produce diffuse reflection whereas 102*ii* is selected or otherwise processed to provide specular reflection, though this is by way of example and not by way of limitation.

Figure 14B:
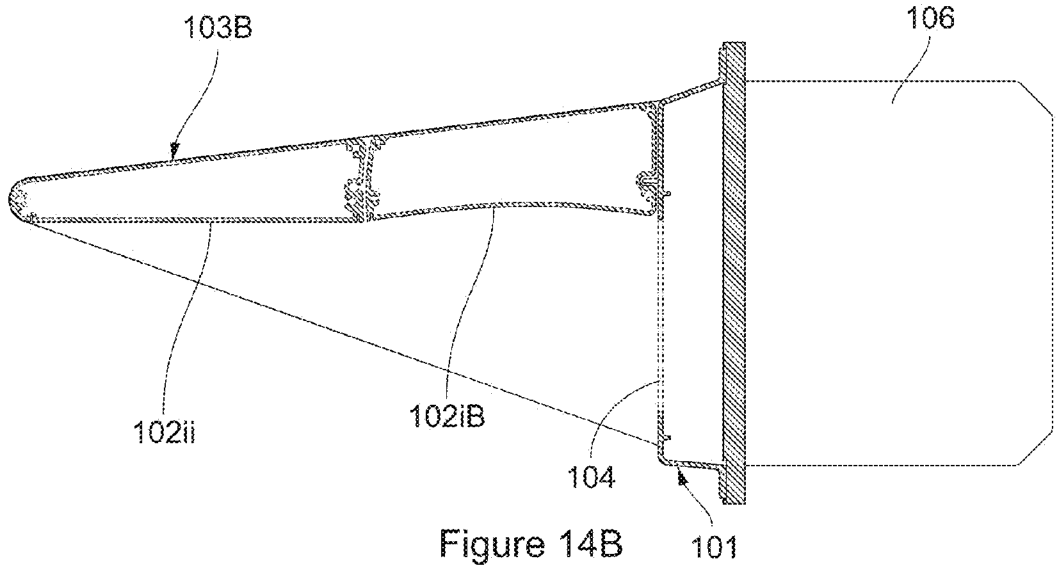
Figure 15B:
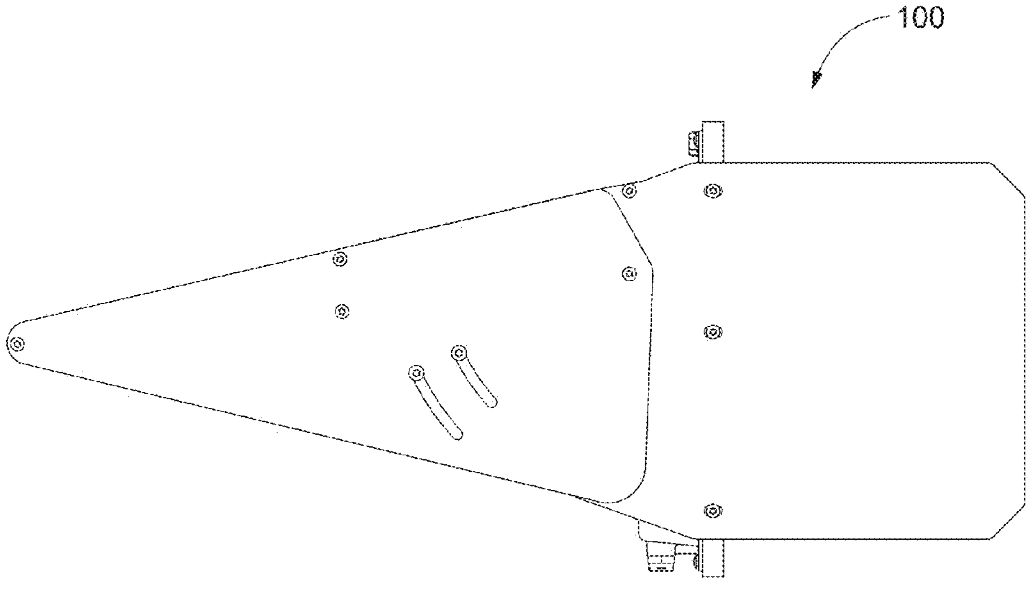
Figure 16A:
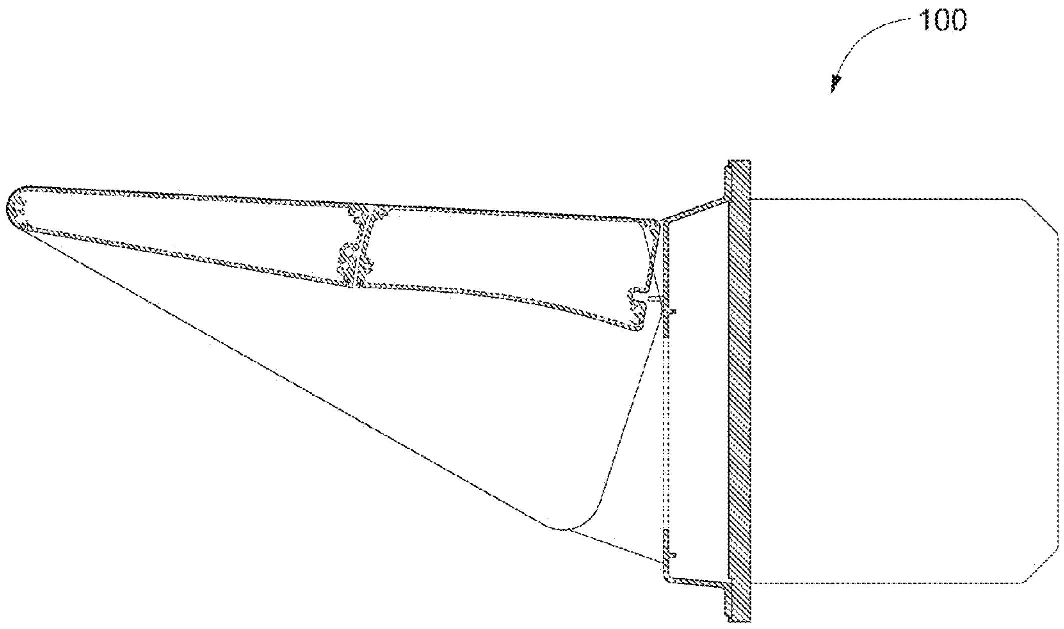
Figure 16B:
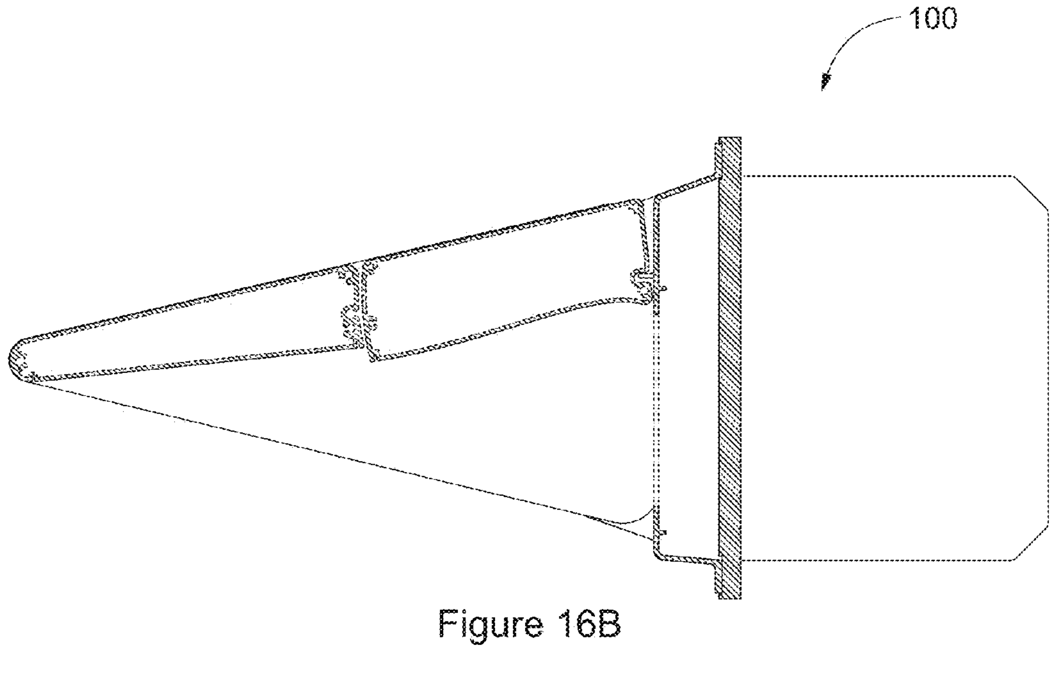
Figure 16C:
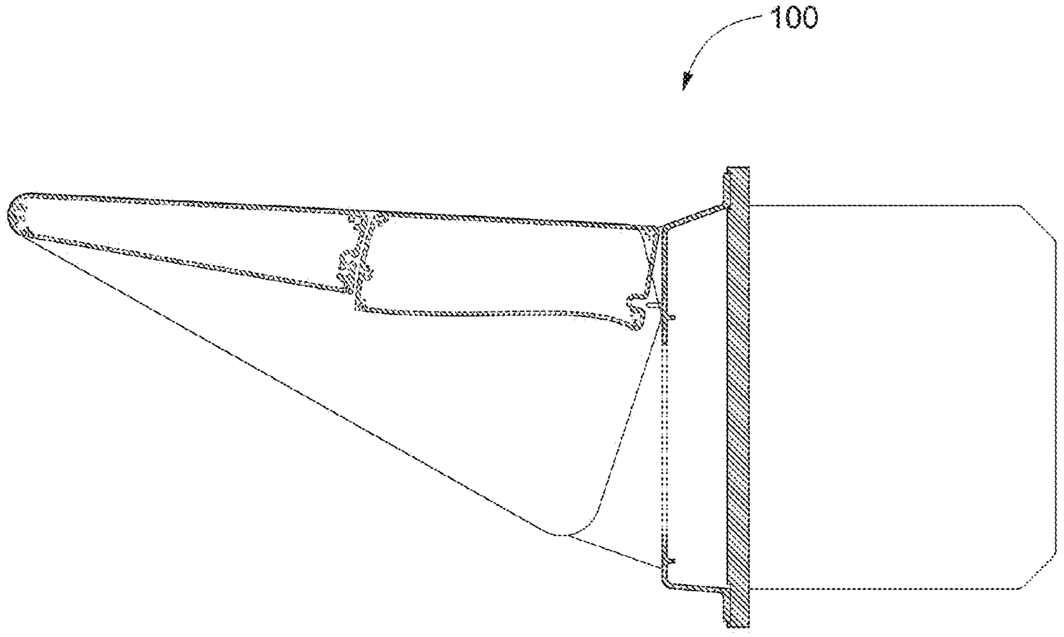
Figure 16D:
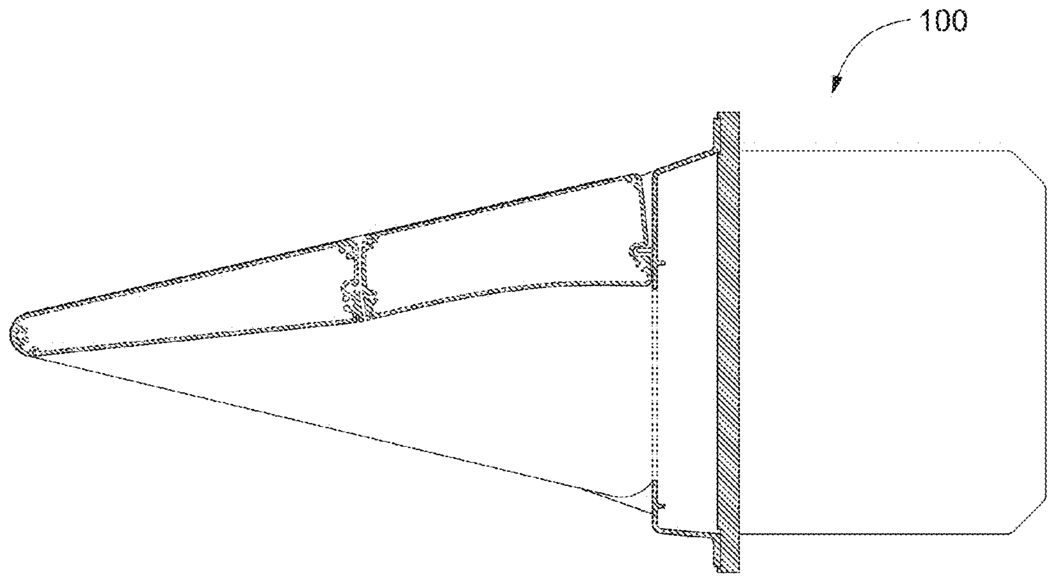

By combining a fixed external visor with a pivotable external visor, cutoff can be selective (thereby also providing a degree of offsite glare control) without impacting the center beam. Additional configurations and options all of which could be combined within a single lighting system (even within a single array) to further improve beam control are illustrated in FIGS. 15A-16D; note that most reference numbers have been removed so to more clearly illustrate the differences between configurations. FIG. 15A illustrates LED luminaire 100 fully pivoted upward, FIG. 15B illustrates LED luminaire 100 fully pivoted downward, FIG. 16A illustrates LED luminaire 100 fully pivoted upward with fixed reflective bottom side 102*i*B of FIG. 14B, FIG. 16B illustrates LED luminaire 100 fully pivoted downward with fixed reflective bottom side 102*i*A of FIG. 14A, FIG. 16C illustrates LED luminaire 100 fully pivoted upward with fixed reflective bottom side 102*i*A of FIG. 14A, and FIG. 16D illustrates LED luminaire 100 pivoted fully downward with fixed reflective bottom side 102*i*B of FIG. 14B.

As can be seen and understood by those skilled in the art, the external visor sections or portions can be produced from sheet metal (e.g. aluminum or aluminum alloy) and formed into the illustrated shapes. Such materials allow the designer to deform flat sheet metal into the desired curvatures and shapes with tools or forms. In these examples, the visor sections are hollow to decrease weight but allow such external form factors, which can have almost infinite variability. FIGS. 14A-B, 15A-B, and 16A-D show just a few non-limiting examples in cross-sectional of how the reflective surfaces can vary and one or more visor sections can adjust or pivot relative to one another and/or the fixture housing. Other ways to make and form these visor sections and surfaces are possible.

Improved Optic Design

Luminous density of LED fixture 100 can be improved upon by more efficiently using the space within the housing to (i) more tightly pack LEDs, (ii) extract more light from said LEDs and transmit it out of said housing, and (iii) cooperate with the external multi-part visoring system so to make said extracted light more useful, all of which also aids in minimizing onsite and/or offsite glare and providing overall improved beam control. To that end, LED luminaire 100 is further modified to include a multi-part optic system such as that illustrated in FIGS. 17-19; see LED luminaire 200. Aside from the features presently discussed, all other components of the lighting fixture are the same (e.g. parts 200, 201, 203, 204, 206, and 207 correlate to parts 100, 101, 103, 104, 106, and 107).

Within LED luminaire 200 several LED/secondary lens combinations are grouped together to form a linear optical array; each linear optical array is resiliently restrained by a two-part lens array holder 5002/5004 because, as envisioned, lenses 5003 are formed from silicone (which can operate at a much higher temperature than state-of-the-art acrylic lenses but must be restrained due to flexing during thermal expansion) on the order of approximately an inch in total thickness (including the portions which encapsulate the LEDs). Reference numeral 5000 refers generally to this whole combination. Lenses in general typically demonstrate higher transmission efficiency than reflectors but less glare control; as such, each LED in array/board 5001 in the interior of housing 201 includes an associated optic on a one-to-one basis (e.g., one secondary lens 5003 per LED) for enhanced glare control. Each linear optical array is truncated in a plane to increase the number of LEDs possible in the interior of housing 201; said truncation is in the same plane as control provided by the external visor (in this case, the vertical plane) since testing has shown no loss in beam control (as opposed to, for example, truncating in the horizontal plane). A front portion of housing 201 (see reference number 210) is bowed outwardly (or otherwise extended or enlarged) so to accommodate one or more reflective visors/rails 5005/5006 in the interior of the housing to control beam spread (which also reduces haze), all of which is designed to work with the aforementioned multi-part visoring system to provide a synergistic approach to improved beam control. This synergy is also evidenced in the manner in which all parts are colocated during assembly; see fastening devices 211 and 213 relative housing 201 in FIG. 17 (which ensures alignment of LED array/board 5001 relative light transmissive material 204 and external visor 203), as well as fastening devices 214 and 215 in FIGS. 18 and 19 (which ensures alignment of reflective rail 5006 and LED lens array holder 5002/5004 relative housing 201), in addition to more localized alignment pins 5007/5009 (which ensures not only alignment but selective switching out of reflectors 5005 and lens array 5003, respectively).

However, the present invention contemplates even greater possible beam control.

Testing has shown that truncating lenses 5003 in the same plane as that already adequately controlled by external visor 203 results in no loss of beam control in that plane, but permits including more LEDs in housing 201, thereby making LED luminaire 200 more luminously dense. In fact, testing has shown that truncating a lens array 5003 in the vertical plane to remove approximately 0.047" from the top and bottom of lenses normally having a face diameter of 0.5" resulted in a 2% loss in light transmission, but permitted two additional LEDs per array—with no adverse impact to beam control. This minor light loss has been found to be well overcome by the additional LEDs for a given luminaire when operated at high currents, as is the case in sports lighting applications. Furthermore, this approach to increasing luminous density can be equally applied to a number of different beam types; see FIG. 20 and Table 5 below.

TABLE 5

| Configuration | General Beam Type | Approximate Beam Angle (horizontal degrees × vertical degrees) |
|---|---|---|
| 5002/5003/5004A | 5M | 38 × 34 |
| 5002/5003/5004B | 5N | 31 × 31 |
| 5002/5003/5004C | 4W | 28 × 29 |
| 5002/5003/5004D | 3W | 22 × 19 |
| 5002/5003/5004E | 5W | 44 × 38 |
| 5002/5003/5004F | 4N | 24 × 22 |
| 5002/5003/5004G | 4M | 26 × 21 |

If desired, each LED lens array could include a different configuration of lenses 5003 together with an LED and any number of reflective devices (e.g., 5005/5006) to effectuate beam types to achieve a different purpose—to taper light back to a pole, to partially overlap with the light from another fixture to provide uniformity on the field, to provide uplight for aerial sports, etc. As a bonus, each component of the multi-part optic system can be selectively switched in and out (e.g., via removal and insertion of pins 5009 in apertures 5008 for a linear array of lenses 5003) so to produce custom beam patterns to avoid spill light, adequately light target areas of complex shape, and generally improve beam control.

So given a footprint (i.e., the internal space of housing 201), and given the restriction of a one-to-one ratio of optic to LED, optimization of LED light sources may be in accordance with the following.

A plurality of LEDs are arranged to produce an initial composite beam pattern. As can be seen from FIGS. 17 and 18, in the present embodiment this includes regularly spaced rows and columns of LEDs, however for other applications LEDs could be clustered or in regular spaced-apart subsets in accordance with wiring (e.g., multiple strands of series-connected LEDs wired in parallel). Once LEDs are placed on a board and traces laid in accordance with the desired wiring, the board with LEDs is maximized for the available space (i.e., surface 5001)—i.e., scaled up or down, compressed or expanded accordingly.

A step (perhaps included in step 6001 (FIG. 22), later discussed) includes designing LED secondary lenses for use with the array of LEDs on board 5001 when maximized for the footprint. Reflectors have demonstrated poor longevity when used with tightly packed LEDs operating at high current, and so only secondary lenses formed from a high operating temperature material (e.g., silicone) are considered in this embodiment. Secondary lenses formed from a silicone material are arranged in a one-to-one ratio with the LEDs on board 5001 when maximized for the footprint. FIG. 18 illustrates an enlarged partial view of FIG. 17 and shows how a single molded piece of silicone having individual lenses 5003 is seated into a holder base 5002 by co-locating holes 5008 with associated pegs 5009. A holder portion 5004 snap-fits to holder base 5002 thereby positionally affixing lenses 5003 within an array; a section view in FIG. 19 show additional assembly detail. The array is bolted (see reference no. 215) to surface 5001 of housing 201 above or below board 5001 when finally designed. This ensures that the plastic holder 5002/5004 can expand and contract in accordance with fixture temperature without stressing circuit board 5001 and adversely impacting traces or the longevity of the LEDs. The precise design of the secondary lenses in array 5003 depends on the desired beam pattern and other optical devices such as internal reflective side visors 5005 and internal reflective top visor 5006. Internal reflective top visor 5006 is bolted (see reference no. 214) to holder base 5002 and can serve to provide vertical beam control similar to reflective external visor section (discussed earlier), but is primarily designed to provide reflection at extreme angles so that light is not bounced within the housing creating internal glow and acting as an onsite glare source (e.g., from a player looking directly at the lighting fixture). This is likewise true for internal reflective side visors 5005 which are removably snapped or hooked (see reference no. 5007) on holder portion 5004 and for side panels of external visor 103; they aid in providing horizontal beam control, but also provide reflection of light from the sources or block direct viewing of the source to prevent onsite glare. A wide range of beam types can be produced from said secondary lenses; Table 6 details general beam type for the non-limiting examples illustrated in FIG. 20.

TABLE 6

| Configuration | General Beam Type | Approximate Beam Angle (horizontal degrees × vertical degrees) |
|---|---|---|
| 5002/5003/5004A | 5M | 38 × 34 |
| 5002/5003/5004B | 5N | 31 × 31 |
| 5002/5003/5004C | 4W | 28 × 29 |
| 5002/5003/5004D | 3W | 22 × 19 |
| 5002/5003/5004E | 5W | 44 × 38 |
| 5002/5003/5004F | 4N | 24 × 22 |
| 5002/5003/5004G | 4M | 26 × 21 |

A final step (perhaps included in step 6005 (FIG. 22), later discussed) can include re-arranging LEDs and lenses in the array to produce a final composite beam; most often, adding LED/lenses to an array since additional space is available in the footprint following the previous steps. Conceptually, such a method (which may supplement or be a part of method 6000 (FIG. 22, later discussed) flows thusly:

A given footprint is identified and an initial number of light sources are identified and determined to fit within the footprint; for example, a footprint on the order of 250 square inches can accommodate 224 LEDs of a particular model if said LEDs are placed in a 2×7 array (i.e., with two LEDs sharing a lens)

It is found that two LEDs sharing a lens increases the angle over which glare would be perceived for common viewing directions. To avoid this, the designer re-designs the lenses to 1×7 arrays (i.e., a one-to-one ratio of optic to LED) to minimize glare, but in doing so reduces the number of LEDs which can be accommodated to 184

The reduced LED count requires so high of an operating current to hit a designed lumen output that optics show premature failure. As such, the designer truncates the top and bottom portions of the lenses (as opposed to the right and left) in each array because there is no perceivable loss in vertical beam control doing so due to other components associated with the lighting system (e.g., an exterior visor). The result is several 1×9 arrays, which brings the LED count back up to 224 LEDs with no perceivable loss of beam control and a minor loss in transmission efficiency—as transmission efficiency was previously defined—on the order of 2%

This method could be performed for each lighting fixture in an LED lighting system, or only for each lighting fixture dedicated to a different purpose; to taper light back to a pole, to partially overlap with the light from another fixture to provide uniformity on the field, to provide uplight for aerial sports, etc.

Efficiency is increased in wide/large area lighting design by maximizing the number of said higher efficacy sources for a given footprint (i.e., internal space in a lighting fixture). Maximizing the number of LEDs for a given footprint permits a lighting designer to operate said LEDs at as low a current as possible to achieve a designed luminous output, which increases longevity of LEDs and optics.

As previously stated, reflectors have demonstrated poor longevity when used with tightly packed LEDs operating at high current; it is believed this is due to poor metalizing. Metalizing in general is a consistent and satisfactory process of depositing a suitably uniform reflective surface on an inexpensive plastic component. That being said, in a one-to-one optic to LED configuration at sometimes very narrow beam angles, metalizing becomes inconsistent: the part is narrow and deep, and the finish is not of uniform thickness, reflective properties, or fails to coat the entire substrate. Furthermore, it is well known that there is a large difference in thermal expansion of plastic versus aluminum, and so there are challenges in maintaining integrity of the part at higher temperatures. If LEDs were operated at a low current or with a great deal of space between them (perhaps with active air flow), it may not be an issue, but in sports lighting and other wide/large area lighting applications this leads to premature failure of the reflector. Switching to a lens is a boon insomuch that transmission efficiency is increased, but glare control becomes more difficult. Most commercially available secondary lenses are formed from acrylic, regardless of whether they produce "standard" beam types or custom beam types. While most acrylics are rated to 95° C., this is at the edge of what is acceptable for the aforementioned lighting applications where LEDs are driven at high current. Even with an adequate heat sink in place such that thermal transfer on the whole is adequate, the tight packing of narrow and deep optics has demonstrated localized failure; it is believed this is due to absorption of optical radiation. Switching to silicone provides a buffer for operation; silicone can be operated safely to around 150° C. Silicone is also a boon insomuch that it has better flow properties and a lower refractive index than traditional acrylic secondary lenses, but the use of silicone in such an application is widely untested and tolerances are very different than with acrylic lenses. This is another reason why plastic holder 5002/5004 is constructed in its particular way and bolted directly to the housing.

Efficiency is increased in wide/large area lighting design by improving the longevity of optics associated with the LEDs. Improving the longevity of the optics permits the lighting designer to retain beam control over the entire life of the lighting fixture.

C. Options and Alternatives

The invention may take many forms and embodiments. The foregoing examples are but a few of those. To give some sense of some options and alternatives, a few examples are given below.

Generally speaking, it is to be appreciated that while a variety of light directing, light redirecting, and fastening devices have been described and illustrated, these could vary and not depart from at least some aspects of the present invention. For example, reflective rails 5005 and/or 5006 could produce diffuse reflection, specular reflection, spread reflection, or even be coated or processed to be light absorbing instead of reflective. Fastening devices might not be threaded screws; they could be clamps or something considered less removable such as glue or welds.

Regarding lighting design, as previously stated undesirable lighting effects may include shadowing and hot spots; namely, where the light intensity in a region of the target area is too low or too high, respectively, as compared to lighting specifications or other regions of the target area. Instead of a thin silicone sheet which is relatively flat on the emitting face, FIGS. 21A-E illustrate a modification to LED lens array 5003 whereby the face of the uppermost secondary lens is tipped a large degree upward, with each successively lower secondary lens in the array tipped to a lesser degree (here, 3°). Tipping the secondary lenses in this fashion permits one to blend the light upward to provide a degree of uplighting without the aforementioned undesirable lighting effects as well as without shifting the center beam (as the aforementioned critical angle for center beam remains the same); if desired, a secondary visor could be pivoted a maximum degree away from the target area, be entirely missing from the lighting design, or even installed in opposite fashion so to project upward from a low-mounted position (such as that in FIG. 1B), for example. Contrarily, if installed in opposite fashion (i.e., tipped downward), tipping the secondary lenses in this fashion permits one to blend light back towards the pole without the aforementioned undesirable lighting effects as well as without shifting the center beam.

In practice, an LED luminaire designed according to aspects of the present invention could be built from the foundation of a prior art LED luminaire—as is the case in Embodiment 1—but an LED luminaire according to aspects of the present invention could also be designed from the ground up. Such an approach could follow method 6000 of FIG. 22, though it could differ and not depart from at least some aspects of the present invention. According to a first step 6001 a lighting designer or other person would define the luminaire "footprint"; essentially the physical space available within a housing for light sources, light directing devices, light redirecting devices, etc., and the photometric requirements of the lighting application associated with the luminaire such that a rough or initial idea of a lighting system may be formed. A second step 6002 comprises defining where a luminaire lives; essentially, the physical space available outside the housing for visors, aiming angles, pivoting mechanisms, mounting locations, etc., and the photometric issues that may arise from the luminaire interacting with other components of the lighting system or target area. Obviously there is a degree of overlap or interplay between steps 6001 and 6002 as components internal to the fixture and external to the fixture collectively control a composite beam, and so both spaces must be considered before the next step. A third step 6003 comprises using the knowledge gained or defined from steps 6001 and 6002 to design light redirecting and light directing devices—inside and outside the housing of the luminaire—so to provide vertical and horizontal beam control given footprint, photometric, and other limitations. For example, if steps 6001 and 6002 determine a particular spacing between luminaires on a common crossarm, step 6003 would take this into consideration when selecting a length of visor so not to result in an interference scenario such as that illustrated in FIG. 2B. A fourth step 6004 comprises designing light directing devices, light redirecting devices, pivoting mechanisms, etc. to provide offsite and/or onsite glare control. Again there is an overlap and/or interplay—here, between steps 6003 and 6004—which ultimately speaks to the synergistic effect of the approach. A final step 6005 comprises increasing luminous density (e.g., via truncating lenses), if such is possible given the considerations of the previous steps.

Regarding light directing and light redirecting devices, as has been stated and illustrated a number of options and alternatives are contemplated according to aspects of the present invention; one specific alternative is illustrated in FIGS. 23A-I. As can be seen from alternative multi-part external visor 303, said visor can comprise multiple fixed and/or pivotable portions. In this particular example, two pivotable portions—via pivoting structures 307*i* and 307*ii*—abut either side of a fixed portion (see reference nos. 305*ii* and 302*ii*) so to permit additional pivoting about point U (see FIG. 23H). The first of said pivotable portions generally comprises parts 105*i* (see FIG. 11) and 102*i* (see FIG. 12) which would be affixed to alternative external visor 303 at point S (see FIG. 23A and FIG. 6); the second of said pivotable portions generally comprises parts 305*iii* and 302*iii*. A similar gap at point G (see FIG. 23G and FIG. 11) exists where there is no ribbing or reflective surfaces so to permit a full range of pivoting without interference. If desired, none, all, or some of the light redirecting devices of alternative external visor 303 could be light absorbing; alternatively, said surface(s) could be reflective but produce spread or diffuse reflection (instead of specular reflection). This is likewise true for all configurations contemplated by the present invention.

Some other possible options and alternatives include: fewer or more light directing and/or light redirecting devices (see additional reflective surfaces 316 of FIG. 23H for additional horizontal beam control); one or more pieces to provide structural rigidity to withstand wind in outdoor, elevated use (see rigid side plates 312 of FIG. 23H); different processing methods (note the thickness of part 305*ii* in FIG. 23H (which is extruded) in comparison to part 305*iii* (which is sheet metal which is laser cut and riveted); different fastening means (including, but not limited to, bolts, screws, glue, welds, rivets, clamps, etc.); designs of ribbing other than what was tested; designs of secondary lens other than what was tested/illustrated herein; and structures other than poles including, but not limited to, trusses, frameworks, in-ground mounted, recessed mounts, indoor mounts, towers, and generally any superstructure.

What is claimed is:

1. A lighting fixture for precision lighting comprising:
- a. a housing comprising:
  - i. an interior space;
  - ii. an opening;
  - iii. a light transmissive material over the opening to at least substantially seal the interior space;
- b. internal light control in the interior space of the housing comprising:
  - i. an array of densely packed LED light sources mounted on an LED mounting substrate having a substantially planar surface;
  - ii. an optic on each LED light source to produce a preliminary light output beam pattern from individual light source output beam patterns wherein the optic comprises:
    1. an emitting face formed from a substantially thin sheet of optical quality silicone-based material; and
    2. a holder to removably clamp and closely position the sheet over a subset of the LED light sources;
  - iii. an internal visor at or near at least some of the LED light sources to selectively redirect a portion of the preliminary light output beam patterns;
  - iv. so that a composite light output is directed out of the opening and light transmissive material of the housing from the plurality of individual redirected LED light sources outputs;
- c. external light control on the housing outside the interior space comprising:
  - i. an external visor at or near the opening having:
    1. at least a first surface that is extendable at least partially into the composite light output from the housing and has selectable:
       - a. reflectivity to control incident light from the composite light output;
       - b. pivotability relative to the housing to selectively adjust cutoff of the composite light output from the housing;

2. at least a second surface outside the composite light output from the housing; and d. an adjustable armature to selectively aim the housing in space so to collectively provide precision lighting.

2. The lighting fixture of claim 1 wherein:

a. the holder restrains the silicone-based material from flexing; and b. the silicone-based material is truncated in a truncation plane which is substantially coplanar with at least one plan defining length or width of the interior space of the housing.

3. The lighting fixture of claim 1 wherein the emitting face of the optic includes at least one portion having a tilt relative the substantially planar surface of the LED mounting substrate to shift a portion of the composite light output in one or more directions.

4. The lighting fixture of claim 1 wherein the internal visor comprises:

a. an elongated rail along a subset of the densely packed LED light sources; and b. wherein the rail is selectively configured regarding:

i. height;

ii. length;

iii. thickness;

iv. material; and v. position relative the subset of densely packed LED light sources for at least one of horizontal or vertical cutoff of the corresponding preliminary light output beam patterns.

5. The lighting fixture of claim 1 wherein the first surface of the external visor comprises one of:

a. one continuous portion or two or more separate portions, each portion selectively configured regarding:

i. specularity;

ii. material;

iii. light absorption;

iv. shape; or v. angular adjustability relative to the other portions of the external visor or the housing.

6. The lighting fixture of claim 1 wherein the second surface of the external visor comprises ribbing.

7. The lighting fixture of claim 6 wherein the ribbing is selectively configured regarding:

a. rib height;

b. rib spacing;

c. rib width;

d. rib angle;

e. material or processing method;

f. reflectivity; and g. continuous or separated sections.

8. The lighting fixture of claim 1 in combination with a plurality of additional said fixtures mounted in a fixture array on a support structure comprising one of the following positioned relative to a target area to be illuminated:

a. a pole;

b. a tower; and c. a superstructure.

9. The combination of claim 8 further comprising a plurality of additional said fixture arrays each on a said support structure placed at different locations relative to the target area to be illuminated.

10. The combination of claim 8 wherein the second surface of the external visor of at least some of said fixtures comprises ribbing, and wherein the at least some fixtures with second surface ribbing are lower in position in the fixture arrays than the fixtures without second surface ribbing.

11. A method of illuminating a target area or space with precision lighting fixtures comprising:

a. elevating a plurality of aimed arrays of lighting fixtures on support structures at different locations relative to the target area or space, each lighting fixture comprising a plurality of densely packed LED light sources sealed in a housing with a light transmissive material;

b. controlling light and glare at each lighting fixture for a given location and elevation and aiming direction of each lighting fixture relative to the target area of space by:

i. producing preliminary light output beam patterns from each LED light source by positioning an optic relative the LED light sources;

ii. selectively redirecting a portion of the preliminary light output beam patterns within the sealed housing by positioning a visor in the housing relative to the LED light sources to produce a composite light output which is directed out of the light transmissive material of the housing;

iii. selectively redirecting a portion of the composite light output outside the sealed housing with a first stationary surface of an external visor; and iv. selectively cutting off the composite light output outside the sealed housing with a first pivotable surface of the external visor that at least partially extends into a portion of composite light output.

12. The method of claim 11 wherein the target area or space comprises a plane and a space above the plane, and wherein the method further comprises aiming a subset of the arrays of lighting fixtures towards the space above the plane.

13. The method of claim 12 wherein the step of aiming a subset of the arrays of lighting fixtures towards the plane comprises pivoting a plurality of adjustable armatures each affixed to a lighting fixture of said subset.

14. The method of claim 13 wherein the support structures comprise poles and a plurality of adjustable armatures are mounted near the top of the poles and the subset of the arrays of lighting fixtures aimed towards the plane are aimed towards the bottom of the poles.

15. The method of claim 14 wherein the step of aiming a subset of the arrays of lighting fixtures towards the space above the plane comprises pivoting a plurality of adjustable armatures each affixed to a lighting fixture of said subset of the arrays of lighting fixtures aimed towards the space above the plane.

16. The method of claim 15 wherein the plurality of adjustable armatures affixed to each of the lighting fixtures in the subset of the arrays of lighting fixtures aimed towards the space above the plane are mounted near the bottom of the poles and the subset of the arrays of lighting fixtures aimed towards the space above the plane are aimed towards the top of the poles.

* * * * *